(12) United States Patent
Xu et al.

(10) Patent No.: US 11,146,805 B2
(45) Date of Patent: *Oct. 12, 2021

(54) METHOD AND APPARATUS FOR VIDEO CODING

(71) Applicant: Tencent America LLC, Palo Alto, CA (US)

(72) Inventors: Xiaozhong Xu, State College, PA (US); Xiang Li, Saratoga, CA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/699,235

(22) Filed: Nov. 29, 2019

(65) Prior Publication Data

US 2020/0177900 A1 Jun. 4, 2020

Related U.S. Application Data

(60) Provisional application No. 62/774,148, filed on Nov. 30, 2018, provisional application No. 62/790,454, filed on Jan. 9, 2019.

(51) Int. Cl.
*H04N 19/44* (2014.01)
*H04N 19/105* (2014.01)
*H04N 19/176* (2014.01)
*H04N 19/423* (2014.01)
(Continued)

(52) U.S. Cl.
CPC .......... *H04N 19/44* (2014.11); *H04N 19/105* (2014.11); *H04N 19/132* (2014.11);
(Continued)

(58) Field of Classification Search
CPC .... H04N 19/44; H04N 19/105; H04N 19/176; H04N 19/423; H04N 19/186;
(Continued)

(56) References Cited

U.S. PATENT DOCUMENTS

2015/0264372 A1* 9/2015 Kolesnikov .......... H04N 19/423
375/240.16
2015/0271517 A1* 9/2015 Pang .................... H04N 19/182
375/240.02
(Continued)

OTHER PUBLICATIONS

PCT Notification of Transmittal of the International Search Report and the Written Opinion of the International Searching Authority, or the Declaration dated Feb. 20, 2020 in application PCT/US2019/063845, (11pages).

*Primary Examiner* — Dramos Kalapodas
(74) *Attorney, Agent, or Firm* — Oblon, McClelland, Maier & Neustadt, L.L.P.

(57) ABSTRACT

Aspects of the disclosure provide methods and apparatuses for video encoding/decoding. In some examples, an apparatus for video decoding includes receiving circuitry and processing circuitry. In some embodiments, the processing circuitry decodes prediction information of a current block in a current coding from a coded video bitstream. The prediction information is indicative of an intra block copy mode. Then, the processing circuitry determines a block vector that points to a reference block in a same picture as the current block. The reference block is restricted within a coding region with reconstructed samples buffered in a reference sample memory. The coding region is one of multiple predefined regions of a coding tree unit (CTU). Then, the processing circuitry reconstructs at least a sample of the current block based on the reconstructed samples of the reference block that are retrieved from the reference sample memory.

20 Claims, 16 Drawing Sheets

(51) Int. Cl.
*H04N 19/186* (2014.01)
*H04N 19/132* (2014.01)

(52) U.S. Cl.
CPC ......... *H04N 19/176* (2014.11); *H04N 19/186* (2014.11); *H04N 19/423* (2014.11)

(58) Field of Classification Search
CPC ...... H04N 19/132; H04N 19/11; H04N 19/55; H04N 19/43; H04N 19/119; H04N 19/513; H04N 19/174; H04N 19/503; H04N 19/172; H04N 19/184
See application file for complete search history.

(56) References Cited

U.S. PATENT DOCUMENTS

| | | | |
|---|---|---|---|
| 2015/0373358 A1* | 12/2015 | Pang | H04N 19/105 375/240.12 |
| 2015/0373366 A1 | 12/2015 | He et al. | |
| 2016/0100189 A1* | 4/2016 | Pang | H04N 19/593 375/240.13 |
| 2016/0337661 A1* | 11/2016 | Pang | H04N 19/182 |
| 2016/0360205 A1* | 12/2016 | Chang | H04N 19/102 |
| 2017/0085917 A1* | 3/2017 | Hannuksela | H04N 19/523 |
| 2017/0127090 A1* | 5/2017 | Rosewarne | H04N 19/139 |
| 2018/0007379 A1 | 1/2018 | Park et al. | |
| 2018/0192072 A1* | 7/2018 | Chen | H04N 5/145 |
| 2019/0068967 A1* | 2/2019 | Ikai | H04N 19/159 |
| 2020/0112717 A1* | 4/2020 | Pham Van | H04N 19/593 |
| 2020/0137400 A1* | 4/2020 | Seregin | H04N 19/593 |
| 2020/0246143 A1* | 8/2020 | Ekvall | A61F 2/2412 |

\* cited by examiner

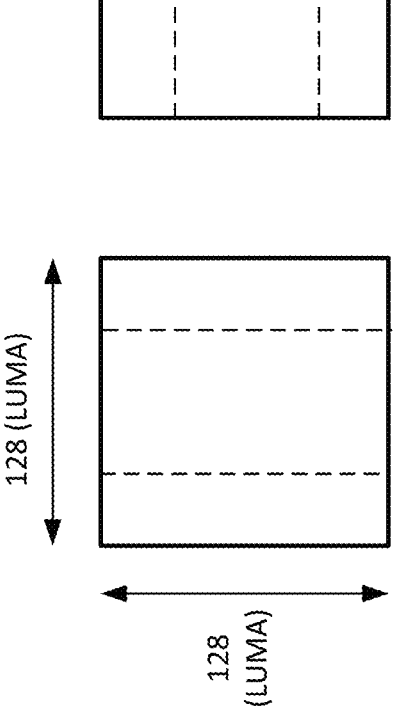
FIG. 9A
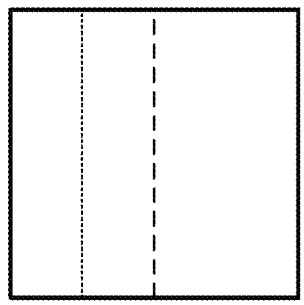
FIG. 9B
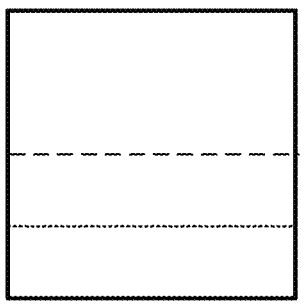
FIG. 9C
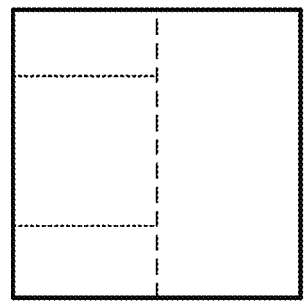
FIG. 9D
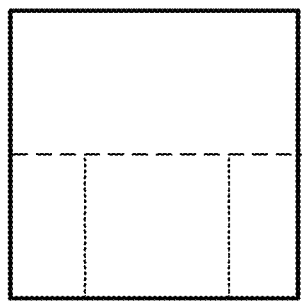
FIG. 9E
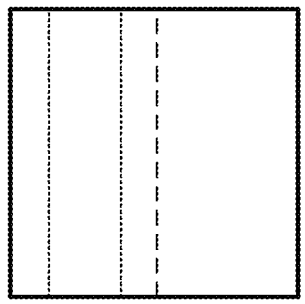
FIG. 9F
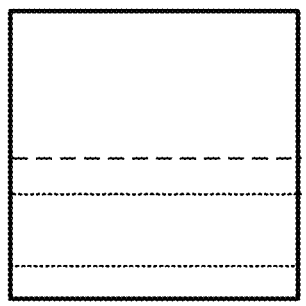
FIG. 9G
FIG. 9H

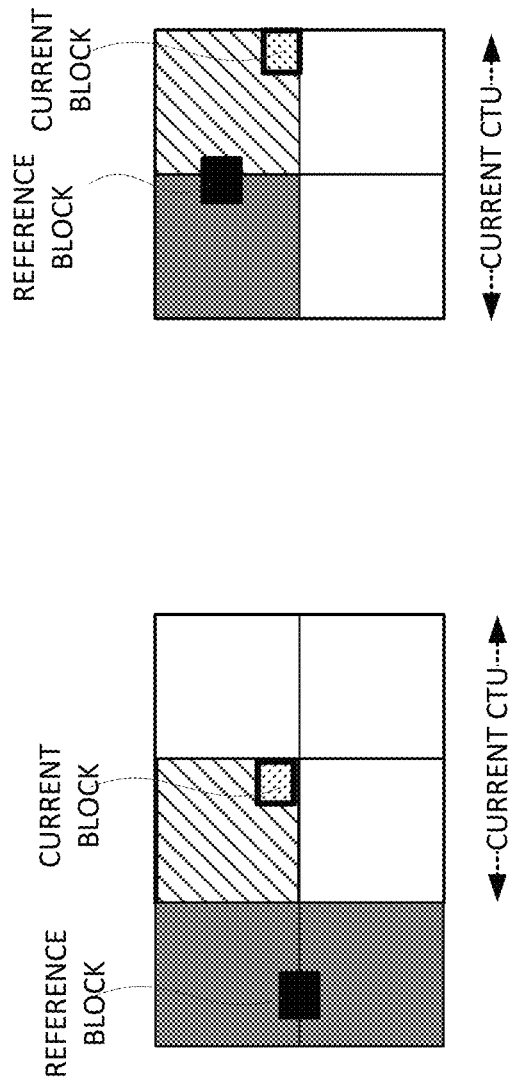

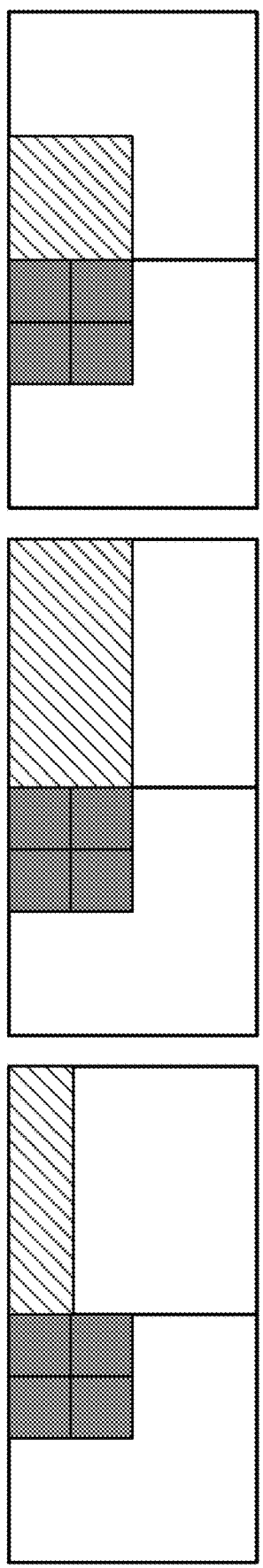
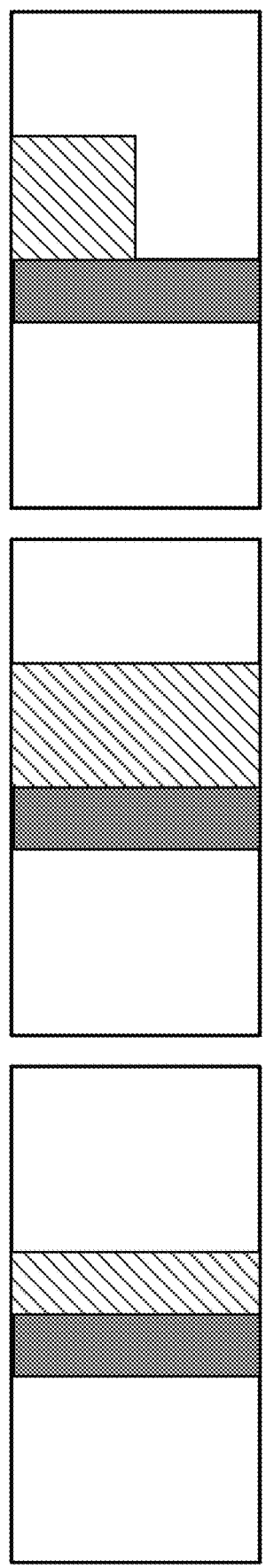
FIG. 12A, FIG. 12B, FIG. 12C, FIG. 12D, FIG. 12E, FIG. 12F

METHOD AND APPARATUS FOR VIDEO CODING

INCORPORATION BY REFERENCE

This present application claims the benefit of priority to U.S. Provisional Application No. 62/774,148, "CONSTRAINTS ON REFERENCE BLOCK LOCATIONS FOR INTRA BLOCK COPY" filed on Nov. 30, 2018, and U.S. Provisional Application No. 62/790,454, "INTRA PICTURE BLOCK COMPENSATION BUFFER REUSE WITH NON SQUARE BLOCK PARTITIONS" filed on Jan. 9, 2019. The entire disclosures of the prior applications are hereby incorporated by reference in their entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920× 1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

A video encoder and decoder can utilize techniques from several broad categories, including, for example, motion compensation, transform, quantization, and entropy coding.

Video codec technologies can include techniques known as intra coding. In intra coding, sample values are represented without reference to samples or other data from previously reconstructed reference pictures. In some video codecs, the picture is spatially subdivided into blocks of samples. When all blocks of samples are coded in intra mode, that picture can be an intra picture. Intra pictures and their derivations such as independent decoder refresh pictures, can be used to reset the decoder state and can, therefore, be used as the first picture in a coded video bitstream and a video session, or as a still image. The samples of an intra block can be exposed to a transform, and the transform coefficients can be quantized before entropy coding. Intra prediction can be a technique that minimizes sample values in the pre-transform domain. In some cases, the smaller the DC value after a transform is, and the smaller the AC coefficients are, the fewer the bits that are required at a given quantization step size to represent the block after entropy coding.

Traditional intra coding such as known from, for example MPEG-2 generation coding technologies, does not use intra prediction. However, some newer video compression technologies include techniques that attempt, from, for example, surrounding sample data and/or metadata obtained during the encoding/decoding of spatially neighboring, and preceding in decoding order, blocks of data. Such techniques are henceforth called "intra prediction" techniques. Note that in at least some cases, intra prediction is only using reference data from the current picture under reconstruction and not from reference pictures.

There can be many different forms of intra prediction. When more than one of such techniques can be used in a given video coding technology, the technique in use can be coded in an intra prediction mode. In certain cases, modes can have submodes and/or parameters, and those can be coded individually or included in the mode codeword. Which codeword to use for a given mode/submode/parameter combination can have an impact in the coding efficiency gain through intra prediction, and so can the entropy coding technology used to translate the codewords into a bitstream.

A certain mode of intra prediction was introduced with H.264, refined in H.265, and further refined in newer coding technologies such as joint exploration model (JEM), versatile video coding (VVC), and benchmark set (BMS). A predictor block can be formed using neighboring sample values belonging to already available samples. Sample values of neighboring samples are copied into the predictor block according to a direction. A reference to the direction in use can be coded in the bitstream or may itself be predicted.

SUMMARY

Aspects of the disclosure provide methods and apparatuses for video encoding/decoding. In some examples, an apparatus for video decoding includes receiving circuitry and processing circuitry. In some embodiments, the processing circuitry decodes prediction information of a current block in a current coding from a coded video bitstream. The prediction information is indicative of an intra block copy mode. Then, the processing circuitry determines a block vector that points to a reference block in a same picture as the current block. The reference block is restricted within a coding region with reconstructed samples buffered in a reference sample memory. The coding region is one of multiple predefined regions of a coding tree unit (CTU). Then, the processing circuitry reconstructs at least a sample of the current block based on the reconstructed samples of the reference block that are retrieved from the reference sample memory.

In some examples, the coding region has a square shape. In an example, the CTU is configured to have 128 samples by 128 samples of a luma component In an embodiment, the reference sample memory is configured to update samples buffered in the reference sample memory in a unit of the coding region.

In some embodiments, the processing circuitry checks whether multiple corners of the reference block are within the coding region.

In an example, when the CTU contains 128×128 luma samples, the coding region size is 64×64 luma samples in size. In another example, when the CTU contains less than 128×128 luma samples, the coding region is the same as the CTU in size.

In some embodiments, the processing circuitry moves the reference block into the coding region when the reference block is partially in the coding region before the moving. In an example, the processing circuitry moves the reference block in a direction to reduce a distance between the reference block and the current block. In another example, the processing circuitry moves the reference block in a direction that increases a percentage of reference samples in the coding region.

In some embodiments, the processing circuitry uses information of a first reference sample that is in the coding region as information of a second reference sample that is out of the coding region when the reference block is partially in the coding region. In some examples, flexible block partition is prohibited in a partition of the CTU.

Aspects of the disclosure also provide a non-transitory computer-readable medium storing instructions which when executed by a computer for video decoding cause the computer to perform the method for video decoding.

BRIEF DESCRIPTION OF THE DRAWINGS

Further features, the nature, and various advantages of the disclosed subject matter will be more apparent from the following detailed description and the accompanying drawings in which:

FIGS. 9A-9H show some examples of partitions that can result in non-square blocks.

FIGS. 11A and 11B show examples of samples in a reference block coming from two different coding regions.

FIGS. 12A-12F show examples of reference samples memory reuse strategies.

DETAILED DESCRIPTION OF EMBODIMENTS

Figure 1:
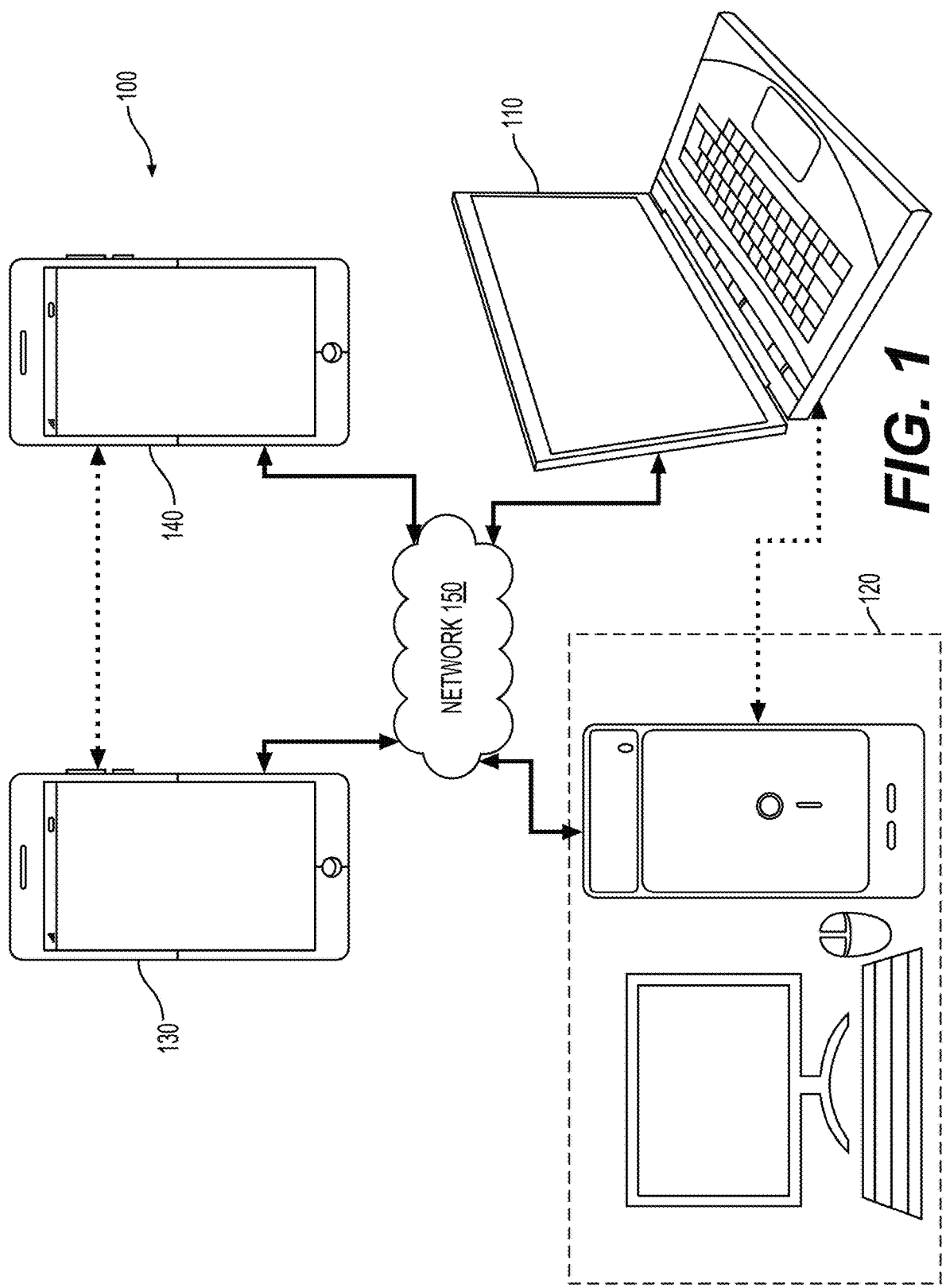
FIG. 1 is a schematic illustration of a simplified block diagram of a communication system (100) in accordance with an embodiment.

FIG. 1 illustrates a simplified block diagram of a communication system (100) according to an embodiment of the present disclosure. The communication system (100) includes a plurality of terminal devices that can communicate with each other, via, for example, a network (150). For example, the communication system (100) includes a first pair of terminal devices (110) and (120) interconnected via the network (150). In the FIG. 1 example, the first pair of terminal devices (110) and (120) performs unidirectional transmission of data. For example, the terminal device (110) may code video data (e.g., a stream of video pictures that are captured by the terminal device (110)) for transmission to the other terminal device (120) via the network (150). The encoded video data can be transmitted in the form of one or more coded video bitstreams. The terminal device (120) may receive the coded video data from the network (150), decode the coded video data to recover the video pictures and display video pictures according to the recovered video data. Unidirectional data transmission may be common in media serving applications and the like.

In another example, the communication system (100) includes a second pair of terminal devices (130) and (140) that performs bidirectional transmission of coded video data that may occur, for example, during videoconferencing. For bidirectional transmission of data, in an example, each terminal device of the terminal devices (130) and (140) may code video data (e.g., a stream of video pictures that are captured by the terminal device) for transmission to the other terminal device of the terminal devices (130) and (140) via the network (150). Each terminal device of the terminal devices (130) and (140) also may receive the coded video data transmitted by the other terminal device of the terminal devices (130) and (140), and may decode the coded video data to recover the video pictures and may display video pictures at an accessible display device according to the recovered video data.

In the FIG. 1 example, the terminal devices (110), (120), (130) and (140) may be illustrated as servers, personal computers and smart phones but the principles of the present disclosure may be not so limited. Embodiments of the present disclosure find application with laptop computers, tablet computers, media players and/or dedicated video conferencing equipment. The network (150) represents any number of networks that convey coded video data among the terminal devices (110), (120), (130) and (140), including for example wireline (wired) and/or wireless communication networks. The communication network (150) may exchange data in circuit-switched and/or packet-switched channels. Representative networks include telecommunications networks, local area networks, wide area networks and/or the Internet. For the purposes of the present discussion, the architecture and topology of the network (150) may be immaterial to the operation of the present disclosure unless explained herein below.

Figure 2:
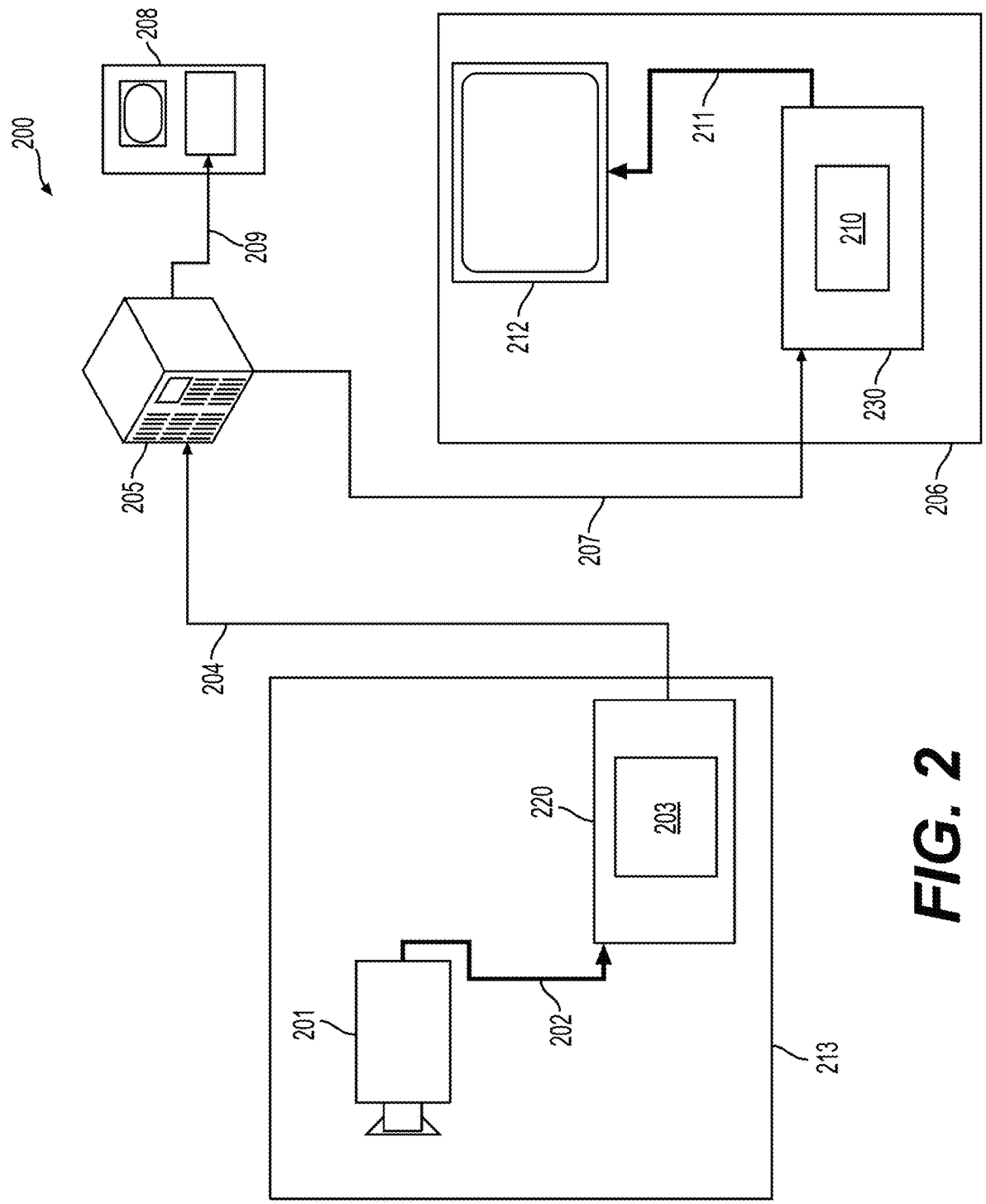
FIG. 2 is a schematic illustration of a simplified block diagram of a communication system (200) in accordance with an embodiment.

FIG. 2 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (213), that can include a video source (201), for example a digital camera, creating for example a stream of video pictures (202) that are uncompressed. In an example, the stream of video pictures (202) includes samples that are taken by the digital camera. The stream of video pictures (202), depicted as a bold line to emphasize a high data volume when compared to encoded video data (204) (or coded video bitstreams), can be processed by an electronic device (220) that includes a video encoder (203) coupled to the video source (201). The video encoder (203) can include hardware, software, or a combination thereof to enable or implement aspects of the disclosed subject matter as described in more detail below. The encoded video data (204) (or encoded video bitstream (204)), depicted as a thin line to emphasize the lower data volume when compared to the stream of video pictures (202), can be stored on a streaming server (205) for future use. One or more streaming client subsystems, such as client subsystems (206) and (208) in FIG. 2 can access the streaming server (205) to retrieve copies (207) and (209) of the encoded video data (204). A client subsystem (206) can include a video decoder (210), for example, in an electronic device (230). The video decoder (210) decodes the incoming copy (207) of the encoded video data and creates an outgoing stream of video pictures (211) that can be rendered on a display (212) (e.g., display screen) or other rendering device (not depicted). In some streaming systems, the encoded video data (204), (207), and (209) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (220) and (230) can include other components (not shown). For example, the electronic device (220) can include a video decoder (not shown) and the electronic device (230) can include a video encoder (not shown) as well.

Figure 3:
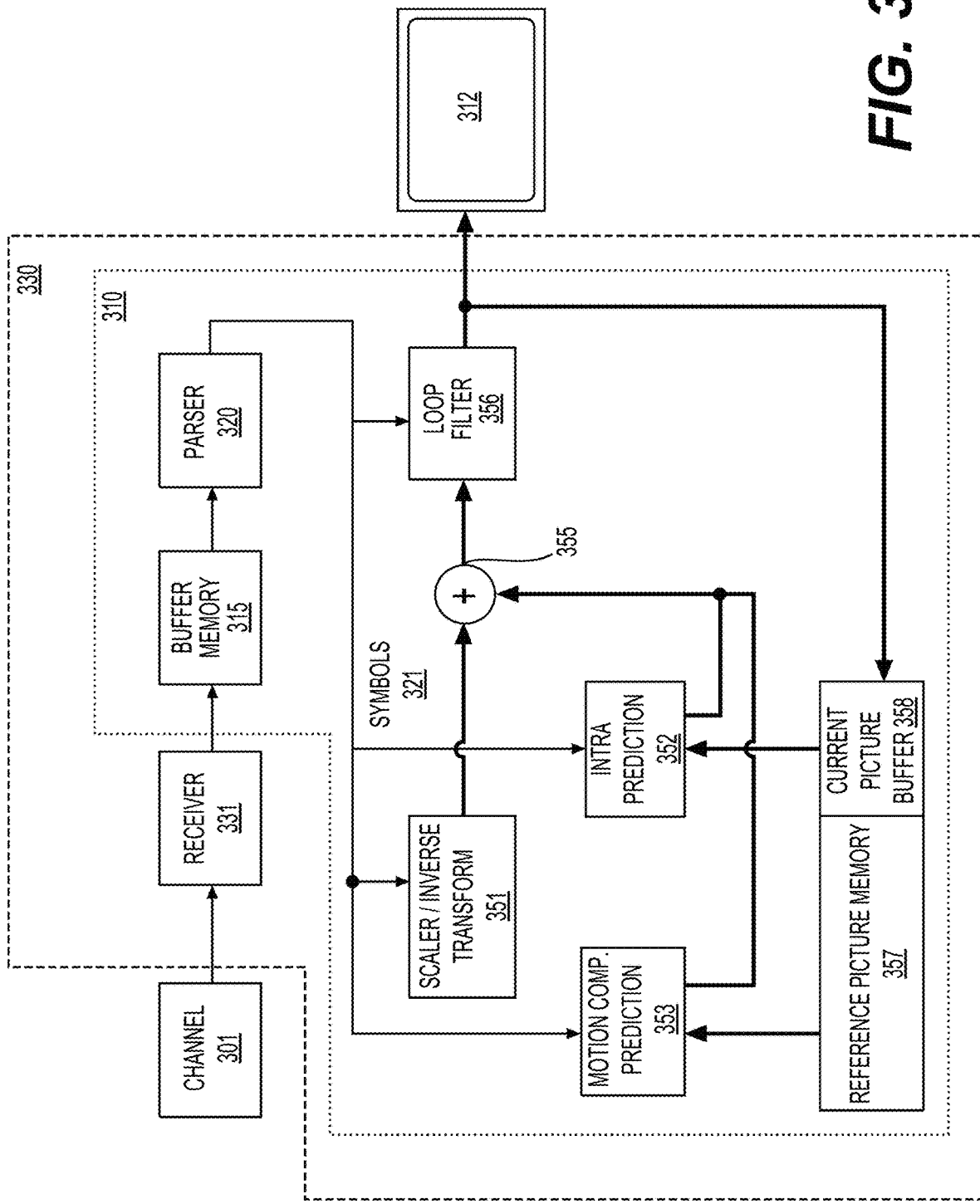
FIG. 3 is a schematic illustration of a simplified block diagram of a decoder in accordance with an embodiment.

FIG. 3 shows a block diagram of a video decoder (310) according to an embodiment of the present disclosure. The video decoder (310) can be included in an electronic device (330). The electronic device (330) can include a receiver (331) (e.g., receiving circuitry). The video decoder (310) can be used in the place of the video decoder (210) in the FIG. 2 example.

The receiver (331) may receive one or more coded video sequences to be decoded by the video decoder (310); in the same or another embodiment, one coded video sequence at a time, where the decoding of each coded video sequence is independent from other coded video sequences. The coded video sequence may be received from a channel (301), which may be a hardware/software link to a storage device which stores the encoded video data. The receiver (331) may receive the encoded video data with other data, for example, coded audio data and/or ancillary data streams, that may be forwarded to their respective using entities (not depicted). The receiver (331) may separate the coded video sequence from the other data. To combat network jitter, a buffer memory (315) may be coupled in between the receiver (331) and an entropy decoder/parser (320) ("parser (320)" henceforth). In certain applications, the buffer memory (315) is part of the video decoder (310). In others, it can be outside of the video decoder (310) (not depicted). In still others, there can be a buffer memory (not depicted) outside of the video decoder (310), for example to combat network jitter, and in addition another buffer memory (315) inside the video decoder (310), for example to handle playout timing. When the receiver (331) is receiving data from a store/forward device of sufficient bandwidth and controllability, or from an isosynchronous network, the buffer memory (315) may not be needed, or can be small. For use on best effort packet networks such as the Internet, the buffer memory (315) may be required, can be comparatively large and can be advantageously of adaptive size, and may at least partially be implemented in an operating system or similar elements (not depicted) outside of the video decoder (310).

The video decoder (310) may include the parser (320) to reconstruct symbols (321) from the coded video sequence. Categories of those symbols include information used to manage operation of the video decoder (310), and potentially information to control a rendering device such as a render device (312) (e.g., a display screen) that is not an integral part of the electronic device (330) but can be coupled to the electronic device (330), as was shown in FIG. 3. The control information for the rendering device(s) may be in the form of Supplemental Enhancement Information (SEI messages) or Video Usability Information (VUI) parameter set fragments (not depicted). The parser (320) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (320) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (320) may also extract from the coded video sequence information such as transform coefficients, quantizer parameter values, motion vectors, and so forth.

The parser (320) may perform an entropy decoding/parsing operation on the video sequence received from the buffer memory (315), so as to create symbols (321).

Reconstruction of the symbols (321) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (320). The flow of such subgroup control information between the parser (320) and the multiple units below is not depicted for clarity.

Beyond the functional blocks already mentioned, the video decoder (310) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (351). The scaler/inverse transform unit (351) receives a quantized transform coefficient as well as control information, including which transform to use, block size, quantization factor, quantization scaling matrices, etc. as symbol(s) (321) from the parser (320). The scaler/inverse transform unit (351) can output blocks comprising sample values, that can be input into aggregator (355).

In some cases, the output samples of the scaler/inverse transform (351) can pertain to an intra coded block; that is: a block that is not using predictive information from previously reconstructed pictures, but can use predictive information from previously reconstructed parts of the current picture. Such predictive information can be provided by an intra picture prediction unit (352). In some cases, the intra picture prediction unit (352) generates a block of the same size and shape of the block under reconstruction, using surrounding already reconstructed information fetched from the current picture buffer (358). The current picture buffer (358) buffers, for example, partly reconstructed current picture and/or fully reconstructed current picture. The aggregator (355), in some cases, adds, on a per sample basis, the prediction information the intra prediction unit (352) has generated to the output sample information as provided by the scaler/inverse transform unit (351).

In other cases, the output samples of the scaler/inverse transform unit (351) can pertain to an inter coded, and potentially motion compensated block. In such a case, a motion compensation prediction unit (353) can access reference picture memory (357) to fetch samples used for prediction. After motion compensating the fetched samples in accordance with the symbols (321) pertaining to the block, these samples can be added by the aggregator (355) to the output of the scaler/inverse transform unit (351) (in this case called the residual samples or residual signal) so as to generate output sample information. The addresses within the reference picture memory (357) from where the motion compensation prediction unit (353) fetches prediction samples can be controlled by motion vectors, available to the motion compensation prediction unit (353) in the form of symbols (321) that can have, for example X, Y, and reference picture components. Motion compensation also can include interpolation of sample values as fetched from the reference picture memory (357) when sub-sample exact motion vectors are in use, motion vector prediction mechanisms, and so forth.

The output samples of the aggregator (355) can be subject to various loop filtering techniques in the loop filter unit (356). Video compression technologies can include in-loop filter technologies that are controlled by parameters included in the coded video sequence (also referred to as coded video bitstream) and made available to the loop filter unit (356) as symbols (321) from the parser (320), but can also be responsive to meta-information obtained during the decoding of previous (in decoding order) parts of the coded picture or coded video sequence, as well as responsive to previously reconstructed and loop-filtered sample values.

The output of the loop filter unit (356) can be a sample stream that can be output to the render device (312) as well as stored in the reference picture memory (357) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (320)), the current picture buffer (358) can become a part of the reference picture memory (357), and a fresh current picture buffer can be reallocated before commencing the reconstruction of the following coded picture.

The video decoder (310) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (331) may receive additional (redundant) data with the encoded video. The additional data may be included as part of the coded video sequence(s). The additional data may be used by the video decoder (310) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 4:
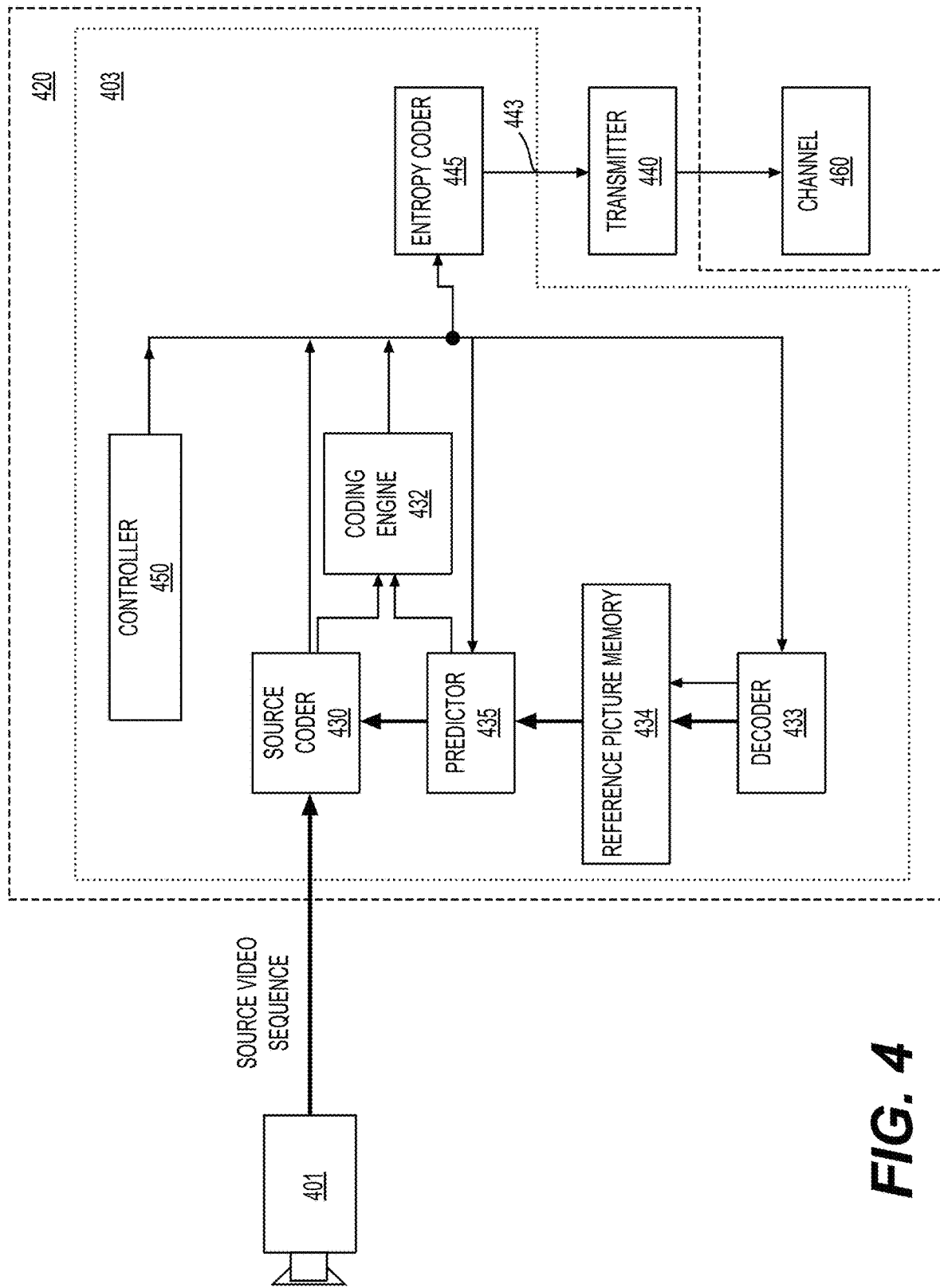
FIG. 4 is a schematic illustration of a simplified block diagram of an encoder in accordance with an embodiment.

FIG. 4 shows a block diagram of a video encoder (403) according to an embodiment of the present disclosure. The video encoder (403) is included in an electronic device (420). The electronic device (420) includes a transmitter (440) (e.g., transmitting circuitry). The video encoder (403) can be used in the place of the video encoder (203) in the FIG. 2 example.

The video encoder (403) may receive video samples from a video source (401) (that is not part of the electronic device (420) in the FIG. 4 example) that may capture video image(s) to be coded by the video encoder (403). In another example, the video source (401) is a part of the electronic device (420).

The video source (401) may provide the source video sequence to be coded by the video encoder (403) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (401) may be a storage device storing previously prepared video. In a videoconferencing system, the video source (401) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (403) may code and compress the pictures of the source video sequence into a coded video sequence (443) in real time or under any other time constraints as required by the application. Enforcing appropriate coding speed is one function of a controller (450). In some embodiments, the controller (450) controls other functional units as described below and is functionally coupled to the other functional units. The coupling is not depicted for clarity. Parameters set by the controller (450) can include rate control related parameters (picture skip, quantizer, lambda value of rate-distortion optimization techniques, . . . ), picture size, group of pictures (GOP) layout, maximum motion vector search range, and so forth. The controller (450) can be configured to have other suitable functions that pertain to the video encoder (403) optimized for a certain system design.

In some embodiments, the video encoder (403) is configured to operate in a coding loop. As an oversimplified description, in an example, the coding loop can include a source coder (430) (e.g., responsible for creating symbols, such as a symbol stream, based on an input picture to be coded, and a reference picture(s)), and a (local) decoder (433) embedded in the video encoder (403). The decoder (433) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (434). As the decoding of a symbol stream leads to bit-exact results independent of decoder location (local or remote), the content in the reference picture memory (434) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (433) can be the same as of a "remote" decoder, such as the video decoder (310), which has already been described in detail above in conjunction with FIG. 3. Briefly referring also to FIG. 3, however, as symbols are available and encoding/decoding of symbols to a coded video sequence by an entropy coder (445) and the parser (320) can be lossless, the entropy decoding parts of the video decoder (310), including the buffer memory (315), and parser (320) may not be fully implemented in the local decoder (433).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (430) may perform motion compensated predictive coding, which codes an input picture predictively with reference to one or more previously-coded picture from the video sequence that were designated as "reference pictures". In this manner, the coding engine (432) codes differences between pixel blocks of an input picture and pixel blocks of reference picture(s) that may be selected as prediction reference(s) to the input picture.

The local video decoder (433) may decode coded video data of pictures that may be designated as reference pictures, based on symbols created by the source coder (430). Operations of the coding engine (432) may advantageously be lossy processes. When the coded video data may be decoded at a video decoder (not shown in FIG. 4), the reconstructed video sequence typically may be a replica of the source video sequence with some errors. The local video decoder (433) replicates decoding processes that may be performed by the video decoder on reference pictures and may cause reconstructed reference pictures to be stored in the reference picture cache (434). In this manner, the video encoder (403) may store copies of reconstructed reference pictures locally that have common content as the reconstructed reference pictures that will be obtained by a far-end video decoder (absent transmission errors).

The predictor (435) may perform prediction searches for the coding engine (432). That is, for a new picture to be coded, the predictor (435) may search the reference picture memory (434) for sample data (as candidate reference pixel blocks) or certain metadata such as reference picture motion vectors, block shapes, and so on, that may serve as an appropriate prediction reference for the new pictures. The predictor (435) may operate on a sample block-by-pixel block basis to find appropriate prediction references. In some cases, as determined by search results obtained by the predictor (435), an input picture may have prediction references drawn from multiple reference pictures stored in the reference picture memory (434).

The controller (450) may manage coding operations of the source coder (430), including, for example, setting of parameters and subgroup parameters used for encoding the video data.

Output of all aforementioned functional units may be subjected to entropy coding in the entropy coder (445). The entropy coder (445) translates the symbols as generated by the various functional units into a coded video sequence, by lossless compressing the symbols according to technologies such as Huffman coding, variable length coding, arithmetic coding, and so forth.

The transmitter (440) may buffer the coded video sequence(s) as created by the entropy coder (445) to prepare for transmission via a communication channel (460), which may be a hardware/software link to a storage device which would store the encoded video data. The transmitter (440) may merge coded video data from the video coder (403) with other data to be transmitted, for example, coded audio data and/or ancillary data streams (sources not shown).

The controller (450) may manage operation of the video encoder (403). During coding, the controller (450) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (403) may perform coding operations according to a predetermined video coding technology or standard, such as ITU-T Rec. H.265. In its operation, the video encoder (403) may perform various compression operations, including predictive coding operations that exploit temporal and spatial redundancies in the input video sequence. The coded video data, therefore, may conform to a syntax specified by the video coding technology or standard being used.

In an embodiment, the transmitter (440) may transmit additional data with the encoded video. The source coder (430) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 5:
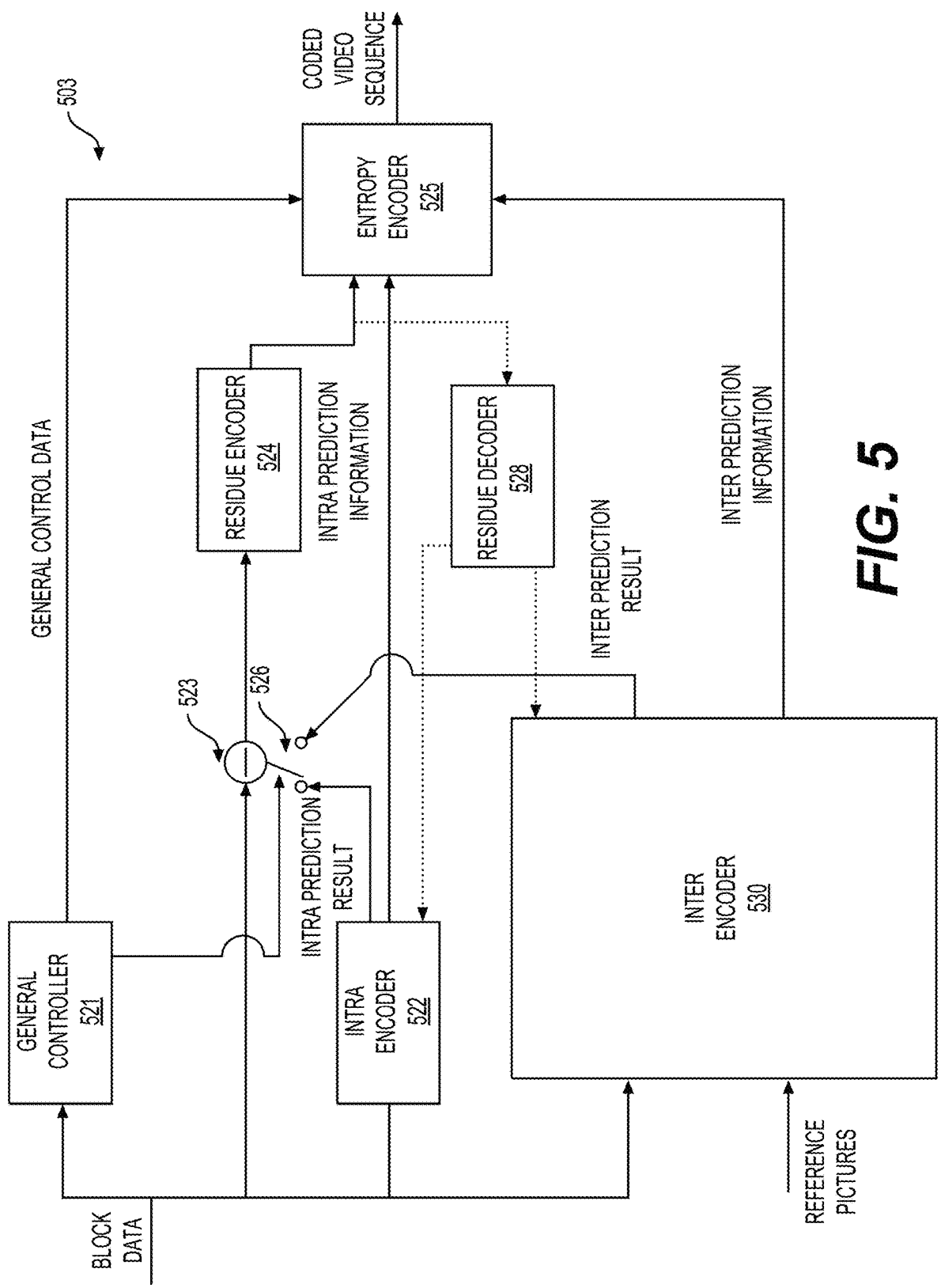
FIG. 5 shows a block diagram of an encoder in accordance with another embodiment.

FIG. 5 shows a diagram of a video encoder (503) according to another embodiment of the disclosure. The video encoder (503) is configured to receive a processing block (e.g., a prediction block) of sample values within a current video picture in a sequence of video pictures, and encode the processing block into a coded picture that is part of a coded video sequence. In an example, the video encoder (503) is used in the place of the video encoder (203) in the FIG. 2 example.

In an HEVC example, the video encoder (503) receives a matrix of sample values for a processing block, such as a prediction block of 8×8 samples, and the like. The video encoder (503) determines whether the processing block is best coded using intra mode, inter mode, or bi-prediction mode using, for example, rate-distortion optimization. When the processing block is to be coded in intra mode, the video encoder (503) may use an intra prediction technique to encode the processing block into the coded picture; and when the processing block is to be coded in inter mode or bi-prediction mode, the video encoder (503) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (503) includes other components, such as a mode decision module (not shown) to determine the mode of the processing blocks.

In the FIG. 5 example, the video encoder (503) includes the inter encoder (530), an intra encoder (522), a residue calculator (523), a switch (526), a residue encoder (524), a general controller (521), and an entropy encoder (525) coupled together as shown in FIG. 5.

The inter encoder (530) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (522) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (522) also calculates intra prediction results (e.g., predicted block) based on the intra prediction information and reference blocks in the same picture.

The general controller (521) is configured to determine general control data and control other components of the video encoder (503) based on the general control data. In an example, the general controller (521) determines the mode of the block, and provides a control signal to the switch (526) based on the mode. For example, when the mode is the intra mode, the general controller (521) controls the switch (526) to select the intra mode result for use by the residue calculator (523), and controls the entropy encoder (525) to select the intra prediction information and include the intra prediction information in the bitstream; and when the mode is the inter mode, the general controller (521) controls the switch (526) to select the inter prediction result for use by the residue calculator (523), and controls the entropy encoder (525) to select the inter prediction information and include the inter prediction information in the bitstream.

The residue calculator (523) is configured to calculate a difference (residue data) between the received block and prediction results selected from the intra encoder (522) or the inter encoder (530). The residue encoder (524) is configured to operate based on the residue data to encode the residue data to generate the transform coefficients. In an example, the residue encoder (524) is configured to convert the residue data from a spatial domain to a frequency domain, and generate the transform coefficients. The transform coefficients are then subject to quantization processing to obtain quantized transform coefficients. In various embodiments, the video encoder (503) also includes a residue decoder (528). The residue decoder (528) is configured to perform inverse-transform, and generate the decoded residue data. The decoded residue data can be suitably used by the intra encoder (522) and the inter encoder (530). For example, the inter encoder (530) can generate decoded blocks based on the decoded residue data and inter prediction information, and the intra encoder (522) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (525) is configured to format the bitstream to include the encoded block. The entropy encoder (525) is configured to include various information according to a suitable standard, such as the HEVC standard. In an example, the entropy encoder (525) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 6:
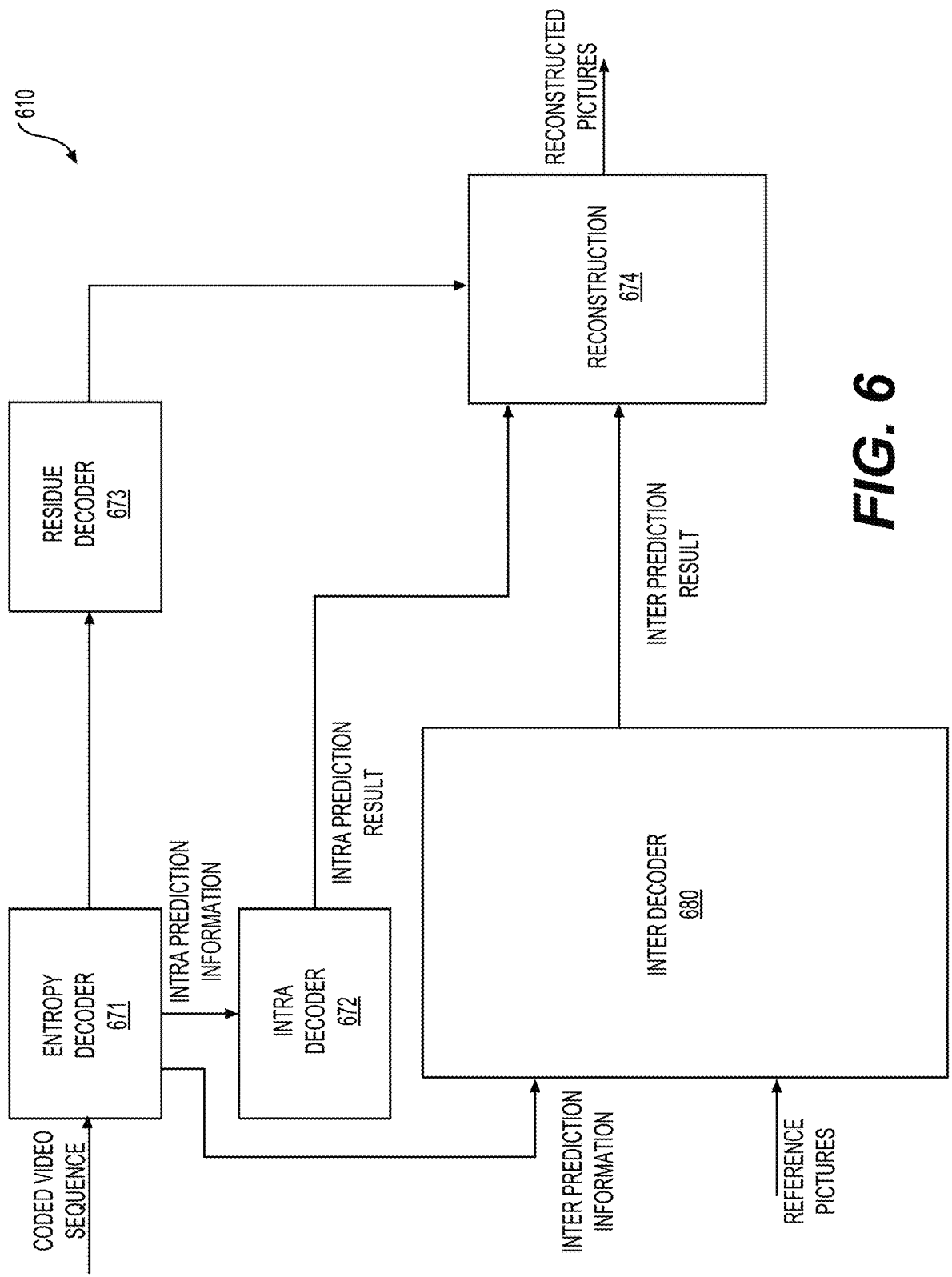
FIG. 6 shows a block diagram of a decoder in accordance with another embodiment.

FIG. 6 shows a diagram of a video decoder (610) according to another embodiment of the disclosure. The video decoder (610) is configured to receive coded pictures that are part of a coded video sequence, and decode the coded pictures to generate reconstructed pictures. In an example, the video decoder (610) is used in the place of the video decoder (210) in the FIG. 2 example.

In the FIG. 6 example, the video decoder (610) includes an entropy decoder (671), an inter decoder (680), a residue decoder (673), a reconstruction module (674), and an intra decoder (672) coupled together as shown in FIG. 6.

The entropy decoder (671) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (672) or the inter decoder (680), respectively, residual information in the form of, for example, quantized transform coefficients, and the like. In an example, when the prediction mode is inter or bi-predicted mode, the inter prediction information is provided to the inter decoder (680); and when the prediction type is the intra prediction type, the intra prediction information is provided to the intra decoder (672). The residual information can be subject to inverse quantization and is provided to the residue decoder (673).

The inter decoder (680) is configured to receive the inter prediction information, and generate inter prediction results based on the inter prediction information.

The intra decoder (672) is configured to receive the intra prediction information, and generate prediction results based on the intra prediction information.

The residue decoder (673) is configured to perform inverse quantization to extract de-quantized transform coefficients, and process the de-quantized transform coefficients to convert the residual from the frequency domain to the spatial domain. The residue decoder (673) may also require certain control information (to include the Quantizer Parameter (QP)), and that information may be provided by the entropy decoder (671) (data path not depicted as this may be low volume control information only).

The reconstruction module (674) is configured to combine, in the spatial domain, the residual as output by the residue decoder (673) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (203), (403), and (503), and the video decoders (210), (310), and (610) can be implemented using any suitable technique. In an embodiment, the video encoders (203), (403), and (503), and the video decoders (210), (310), and (610) can be implemented using one or more integrated circuits. In another embodiment, the video encoders (203), (403), and (403), and the video decoders (210), (310), and (610) can be implemented using one or more processors that execute software instructions.

Aspects of the disclosure provide techniques to constrain reference block locations for intra block copy mode, and provide techniques to re-use intra picture block compensation buffer with non-square block partitions.

Block based compensation can be used for inter prediction and intra prediction. For the inter prediction, block based compensation from a different picture is known as motion compensation. For intra prediction, block based compensation can also be done from a previously reconstructed area within the same picture. The block based compensation from reconstructed area within the same picture is referred to as intra picture block compensation, current picture referencing (CPR) or intra block copy (IBC). A displacement vector that indicates the offset between the current block and the reference block in the same picture is referred to as a block vector (or BV for short). Different from a motion vector in motion compensation, which can be at any value (positive or negative, at either x or y direction), a block vector has a few constraints to ensure that the reference block is available and already reconstructed. Also, in some examples, for parallel processing consideration, some reference area that is tile boundary or wavefront ladder shape boundary is excluded.

The coding of a block vector could be either explicit or implicit. In the explicit mode (similar to advanced motion vector prediction (AMVP) mode in inter coding), the difference between a block vector and its predictor is signaled; in the implicit mode, the block vector is recovered from a predictor (referred to as block vector predictor), in a similar way as a motion vector in merge mode. The resolution of a block vector, in some implementations, is restricted to integer positions; in other systems, the block vector is allowed to point to fractional positions.

In some examples, the use of intra block copy at block level, can be signaled using a block level flag, that is referred to as an IBC flag. In an embodiment, the IBC flag is signaled when the current block is not coded in the merge mode. In another embodiment, the IBC flag is signaled using a reference index approach. The current picture under decoding is then treated as a reference picture. In an example, such a reference picture is put in the last position of a list of reference pictures. This special reference picture is also managed together with other temporal reference pictures in a buffer, such as decoded picture buffer (DPB).

There are also some variations for intra block copy, such as flipped intra block copy (the reference block is flipped horizontally or vertically before used to predict current block), or line based intra block copy (each compensation unit inside an M×N coding block is an M×1 or 1×N line).

Figure 7:
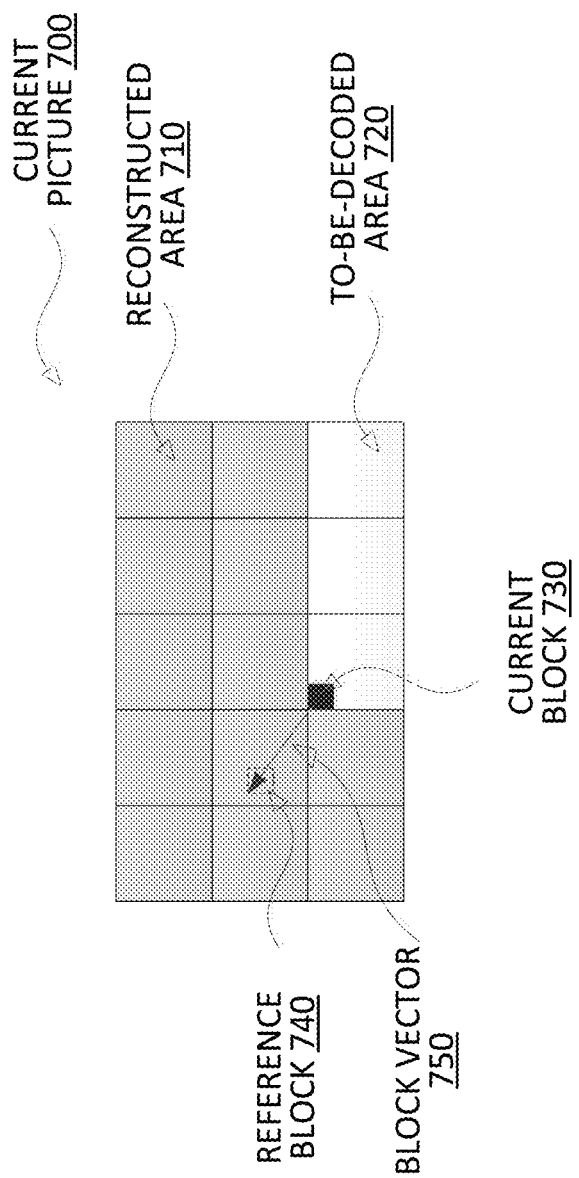
FIG. 7 shows an example of intra block copy according to an embodiment of the disclosure.

FIG. 7 shows an example of intra block copy according to an embodiment of the disclosure. Current picture (700) is under decoding. The current picture (700) includes a reconstructed area (710) (grey area) and to-be-decoded area (720) (white area). A current block (730) is under reconstruction by a decoder. The current block (730) can be reconstructed from a reference block (740) that is in the reconstructed area (710). The position offset between the reference block (740) and the current block (730) is referred to as a block vector (750) (or BV (750)).

In some implementation examples, the reconstructed samples of the current picture can be buffered in a dedicated memory. In consideration of the implementation cost, the reference area cannot be as large as full frame, but up to the memory size of the dedicated memory. In some embodiments, the block vector in the intra block copy is allowed to refer to only some neighboring area, but not the whole picture. In one example, the memory size of the dedicated memory is one CTU, then when the reference block is within the same CTU as the current block, the intra block copy mode can be used. In another example, the memory size is two CTUs, then when the reference block is either within the current CTU, or the CTU to the left of current CTU, the intra block copy mode can be used. When the reference block is outside the designated local area, even the reference block has been reconstructed, the reference samples cannot be used for intra picture block compensation in an example.

With the constrained reference area, the efficiency of intra block copy is limited. There is a need to further improve the efficiency of intra block copy with a constrained reference area.

In some versions of video coding standard, such as in a version of VVC, a picture is divided into an array of non-overlapped CTUs. The size of a CTU is set to be 128×128 luma samples (and the corresponding chroma samples depending on the color format). A CTU can be split into Coding Units (CU) using one or a combination of the tree splitting methods, such as a binary-tree (BT) split, a ternary-tree (TT) split, and the like. A BT split divides a parent block in half in either horizontal or vertical direction. The resulting two smaller partitions of the BT split are half in size as compared to the parent block. A TT split divides the parent block into three parts in either horizontal or vertical direction. The middle part of the three is twice as large as the other two parts. The resulting three smaller partitions of the TT split are ¼, ½ and ¼ in size as compared to the parent block.

In some embodiments, the partitions of a block at 128×128 level are constrained to allow certain results, such as one 128×128 block, two 128×64 blocks, two 64×128 blocks or four 64×64 blocks. In some examples, the partitions are further constrained such that at block level of 128×64 or 64×128, the TT splits at either (horizontal or vertical) direction are not allowed. In addition, in an example, the 128×64 or 64×128 are only allowed to be split into two 64×64 blocks when there is any further split. The constrained partitioning types are referred to as regular partitioning types.

In some examples, intra block copy is implemented with limited memory requirement. In implementation example, the designated memory to store reference samples of previously coded CUs for future intra block copy reference is referred to as reference sample memory. For example, the maximum size of a reference sample memory (also referred to as a buffer) that is used to store unfiltered samples for intra block copy mode is 1 CTU (128×128 luma samples and corresponding chroma samples) size. In order to fully utilize such a constrained memory, in some examples, the buffer is updated on 64×64 basis. When some parts of the reference sample memory has not yet been updated with reconstructed samples from the current CTU, the data stored in those parts of memory are actually the reconstructed samples from the left CTU in an example. These samples may be used as a reference for predicting the current block in intra block copy mode. Then, the effective search range is extended from within the current CTU to some part of the left CTU.

Thus, in some embodiments, the reference sample memory can be reused to store previous coded samples in the left CTU, before the reference sample memory is updated with reconstructed samples in the current CTU. In an embodiment, the availability of the reference sample memory is updated on a 64×64 basis. In an example, if any of the reference samples in a 64×64 block has been updated, the entire 64×64 block is considered as being updated with reconstructed samples from the current CTU and will no longer be considered as storing samples before the update. In some implementation examples, a continuous memory space in a memory (e.g., buffer memory, on chip memory, and the like) are allocated to store reconstructed samples of the 64×64 block, the address operations for storing and reading-back the reconstructed samples from the continuous memory space can be performed with relatively easy calculations. In some examples, the continuous memory space that stores the reconstructed samples of a coding region, such as the 64×64 coding region, is referred to as memory update unit. Accessing samples in a memory update unit can be performed with reduced address calculations, and accessing samples in different memory update units can require increased number of address calculations.

FIGS. 8A-8D show examples of reference sample memory updates on 64×64 basis, and effective search ranges for the intra block copy mode according to an embodiment of the disclosure. In some examples, an encoder/decoder includes a cache memory that is able to store samples of one CTU, such as 128×128 samples. Further, in the FIGS. 8A-8D examples, a CTU is divided into four 64×64 coding regions. The coding region having a current block (may be equal to or smaller than the coding region) for prediction is referred to as a current coding region (labeled as "Curr"). It is noted that the examples can be suitably modified for coding regions of other suitable sizes.

Each of FIGS. 8A-8D shows a current CTU (820) and a left CTU (810). The left CTU (810) includes four coding regions (811)-(814), and each coding region has a sample size of 64×64 samples. The current CTU (820) includes four coding regions (821)-(824), and each coding region has a sample size of 64×64 samples. The current CTU (820) is the CTU that includes a current coding region (as shown by a label "Curr" and with vertical stripe pattern) under reconstruction. The left CTU (810) is the immediate neighbor on the left side of the current CTU (820). It is noted in FIGS. 8A-8D, the grey blocks are coding regions that are already reconstructed, and the white blocks are coding regions that are to be reconstructed.

Figure 8A:
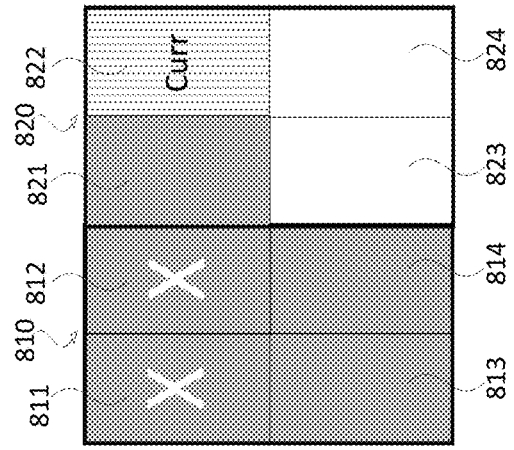
FIGS. 8A-8D show examples of reference sample memory updates, and effective search ranges for the intra block copy mode according to an embodiment of the disclosure.

In FIG. 8A, the current coding region under reconstruction is the coding region (821). The cache memory stores reconstructed samples in the coding regions (812), (813) and (814), and the cache memory will be used to store reconstructed samples of the current coding region (821). In the FIG. 8A example, the effective search range for the current coding region (821) includes the coding regions (812), (813) and (814) in the left CTU (810) with reconstructed samples stored in the cache memory. In an example, when the cache memory is updated with one or more reconstructed samples from the current coding region (821), thus the coding region (811) is considered as not available (marked with "X") in the cache memory for CPR prediction due to the fact that some part of the coding region (811) has been updated by the reconstructed samples from the current CTU. It is noted that, in an embodiment, the reconstructed samples of the coding region (811) are stored in a main memory (e.g., are copied from the cache memory to the main memory before the reconstruction of the coding region (821)) that has a slower access speed than the cache memory.

Figure 8B:
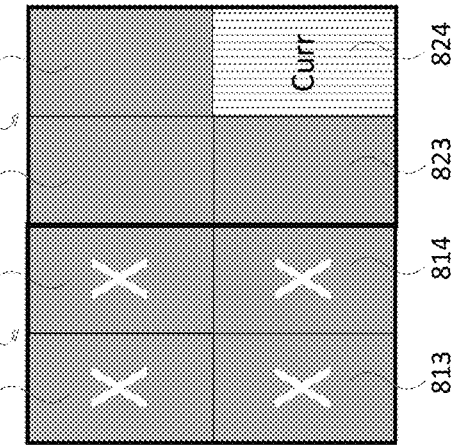

In FIG. 8B, the current coding region under reconstruction is the coding region (822). The cache memory stores reconstructed samples in the coding regions (813), (814) and (821), and the cache memory will be used to store reconstructed samples of the current coding region (822). In the FIG. 8B example, the effective search range for the current coding region (822) includes the coding regions (813) and (814) in the left CTU (810) and (821) in the current CTU (820) with reconstructed samples stored in the cache memory. In an example, when the cache memory is updated with one or more reconstructed samples from the current coding region (822), thus the coding region (812) is considered as not available (marked with "X") in the cache memory for CPR prediction due to the fact that some part of the coding region (812) has been updated by the reconstructed samples from the current CTU. It is noted that, in an embodiment, the reconstructed samples of the coding region (812) are stored in a main memory (e.g., are copied from the cache memory to the main memory before the reconstruction of the coding region (822)) that has a slower access speed than the cache memory.

Figure 8C:
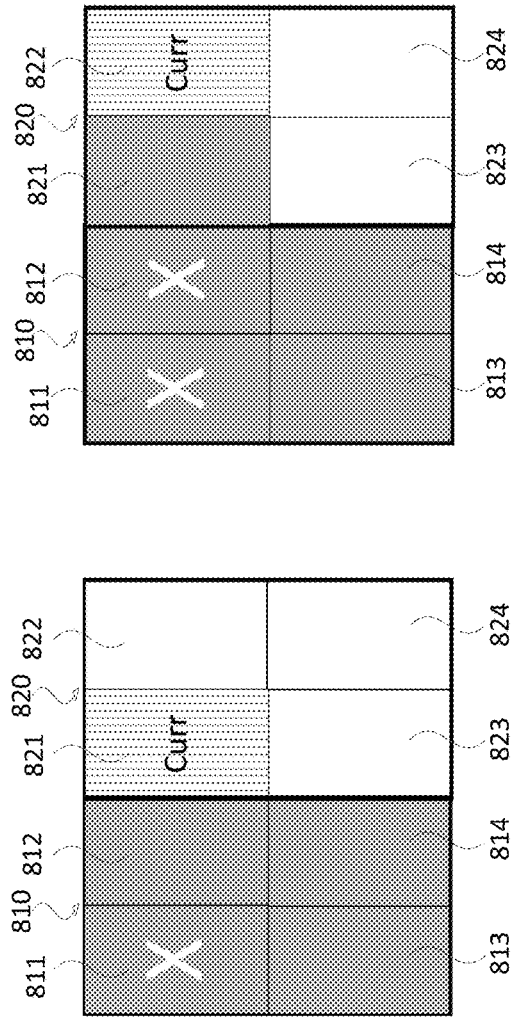

In FIG. 8C, the current coding region under reconstruction is the coding region (823). The cache memory stores reconstructed samples in the coding regions (814), (821) and (822), and the cache memory will be used to store reconstructed samples of the current coding region (823). In the FIG. 8C example, the effective search range for the current block (823) includes the coding regions (814) in the left CTU (810) and (821) and (822) in the current CTU (820) with reconstructed samples stored in the cache memory. In an example, when the cache memory is updated with one or more reconstructed samples from the current coding region (823), thus the coding region (813) is considered as not available (marked with "X") in the cache memory for CPR prediction due to the fact that some part of the coding region (813) has been updated by the reconstructed samples from the current CTU. It is noted that, in an embodiment, the reconstructed samples of the coding region (813) are stored in a main memory (e.g., are copied from the cache memory to the main memory before the reconstruction of the coding region (823)) that has a slower access speed than the cache memory.

Figure 8D:
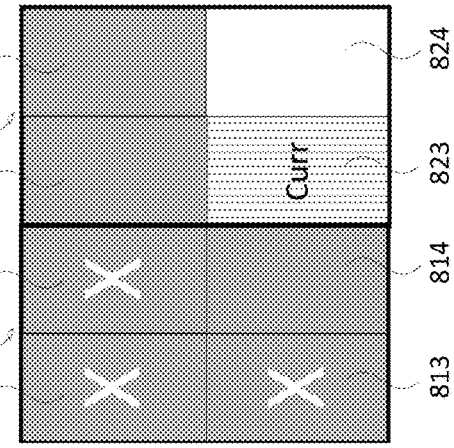

In FIG. 8D, the current coding region under reconstruction is the coding region (824). The cache memory stores reconstructed samples in the coding regions (821), (822) and (823), and the cache memory will be used to store reconstructed samples of the current coding region (824). In the FIG. 8D example, the effective search range for the current coding region (824) includes the blocks (821), (822) and (823) in the current CTU (820) with reconstructed samples stored in the cache memory. In an example, when the cache memory is updated with one or more reconstructed samples from the current coding region (824), thus the coding region (814) is considered as not available (marked with "X") in the cache memory for CPR prediction due to the fact that some part of the coding region (814) has been updated by the reconstructed samples from the current CTU. It is noted that, in an embodiment, the reconstructed samples of the coding region (814) are stored in a main memory (e.g., are copied from the cache memory to the main memory before the reconstruction of the coding region (824)) that has a slower access speed than the cache memory.

It is noted that in the FIGS. 8A-8D example, a total memory of 4×64×64 luma samples (together with corresponding chroma samples) is used for intra block copy compensation. The technique used in the FIGS. 8A-8D example can be suitably modified for other memory sizes, such as total memory of 3×64×64, 2×64×64 luma samples.

It is noted that, in some embodiments, ternary tree partitioning at 128×128 level and lower is allowed, and the partition results can be non-square blocks.

In some examples, at 128×128 level, a CTU can be partitioned using ternary-tree split. For a horizontal TT split, the resulting blocks of partition will be 128×32, 128×64 and 128×32. For a vertical split, the resulting blocks of the partition will be 32×128, 64×128 and 32×128.

Further, in some examples, at 128×64/64×128 level, ternary-tree split can be used and resulting blocks can be non-square blocks.

FIGS. 9A-9H show some examples of partitions that can result in non-square blocks.

According to some aspects of the disclosure, some partition types, such as the TT split at 128×128 level, and the like that can result in a coding block that cannot be contained in a 64×64 coding region or cannot contain one or more 64×64 coding region. These partition types are referred to as flexible partition types.

When these flexible partition types are allowed on top of those regular partition types. The reference sample update process may no longer be aligned with 64×64 coding regions one by one. There is a need to develop methods to enable the reference sample memory buffer reuse strategy as mentioned above.

According to an aspect of the disclosure, certain reference area constraints can be used to improve intra block copy performance. More specifically, in an example, the location of a reference sample block in the reference sample memory is constrained, to be within the same 64×64 coding region. In some embodiments, the size of reference sample memory is fixed to be two 64×64 luma samples (together with corresponding chroma samples). It is noted that the techniques used in the present disclosure can be suitably modified to use for different reference sample memory sizes, such as using three 64×64 luma samples plus corresponding chroma samples, four 64×64 luma samples plus corresponding chroma samples (i.e. 1 CTU size), etc.

Generally, the size of an IBC coded block can be as large as any regular inter coded block. According to an aspect of the present disclosure, in order to utilize the reference sample memory more efficiently, the size of an IBC coded block is limited. In an example, the size of an IBC coded block is limited not to be larger than higher limits, such as 64 luma samples at either width or height (with corresponding size constraints applied to chroma samples, depending on the color format; e.g., in 4:2:0 format, the size of a chroma block in IBC mode should not be larger than 32 samples each side). Further, in some examples, the size of an IBC coded block is limited no to be lower than lower limits, such as 32 luma samples at either width or height. While maximum IBC size of 64×64 luma samples is used in description, it is noted that the techniques can be suitably modified for other maximum IBC size.

In the following description, the maximum size of the reference sample memory that is be used to store intra block copy reference samples corresponds to the memory size for storing two 64×64 luma samples and corresponding chroma samples.

According to some aspects of the disclosure, the reference sample memory has a size for storing sample information of two coding regions, each coding region has a size of 64×64 luma samples, and the sample information includes luma sample information of the 64×64 luma samples and chroma sample information of the corresponding chroma samples. Then, the reference sample memory stores sample information of a current coding region in the current CTU, and sample information of another coding region that is one of some previously coded 64×64 coding regions.

Figure 10A:
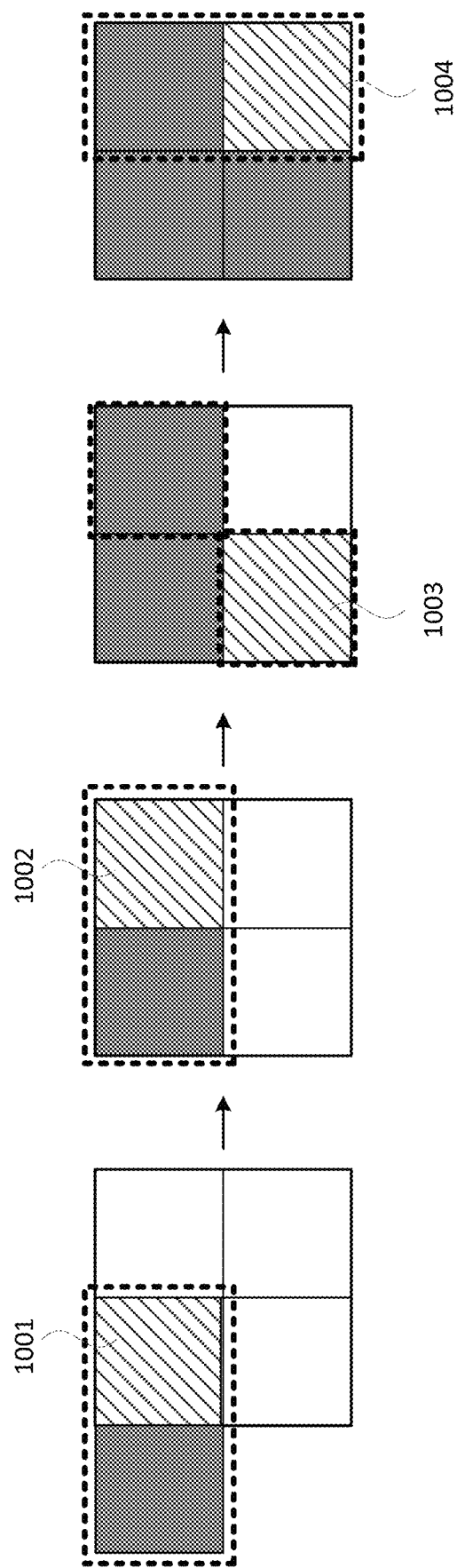
FIGS. 10A and 10B show two examples of coding orders and reference sample memory usage.
Figure 10B:
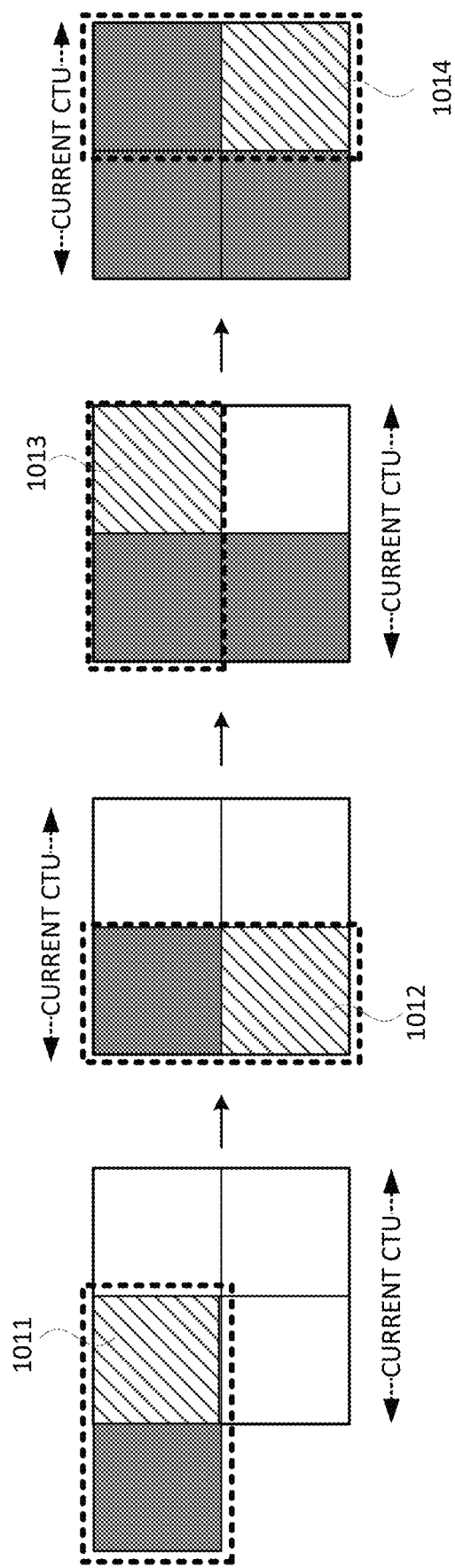

FIGS. 10A and 10B show two examples of coding orders and reference sample memory usage. In FIGS. 10A and 10B, the regions with grey color are coding regions (e.g., 64×64 luma samples) that have been coded; the regions with white color are regions that have not yet been coded; and the region(s) with the slant lines are the coding region(s) where the current coding block is located. Further, in FIGS. 10A and 10B, the two coding regions in the reference sample memory are shown in dotted box(es).

In FIG. 10A, in an example, a CTU is under horizontal binary split or quad-tree split at 128×128 level. Then, the coding order of 64×64 coding regions follows (1001) to (1004).

In FIG. 10B, in an example, a CTU is under vertical binary split at 128×128 level. Then, the coding order of 64×64 coding regions follows (1011) to (1014).

For the examples in FIGS. 10A and 10B, when the current coding block is located in one of the four 64×64 coding regions in the current CTU, the reference sample memory can store another 64×64 coding region that is assigned to be the reference of intra block copy mode.

It is noted that FIGS. 10A and 10B are merely examples, other possible reference area assignments are also possible. In an embodiment, the top-right 64×64 coding region is used as the reference area for the bottom-right 64×64 coding region as shown in FIGS. 10A and 10B. In another embodiment, the top-left 64×64 coding region is used as the reference area for the bottom-right 64×64 coding region.

Ideally, reconstructed samples in the reference sample memory can be used for predicting current block in intra block copy mode. However, sometimes samples in a reference block may come from two different 64×64 coding regions.

FIGS. 11A and 11B show examples of samples in a reference block coming from two different 64×64 coding regions. In FIG. 11A, part of the reference block comes from one 64×64 coded coding region while another part, although already reconstructed, belongs to another 64×64 previously coded coding region. In FIG. 11B, part of the reference block comes from one 64×64 coded region while another part, although already reconstructed, belongs to current 64×64 coding region. Because each of the 64×64 coding regions in the reference sample memory will be operated separately, the two 64×64 coding regions in memory may not be physically connected. These positions of a reference block in different coding regions, such as shown in FIGS. 11A and 11B may bring extra memory access or operations, which is not desirable.

According to some aspects of the disclosure, additional constrains are used with other suitable block vector constraints that make intra block copy work in a particular video/image coding system. The additional constrains are imposed on the block vector of intra block copy mode, such that the whole reference block for intra block copy mode should be located inside the same 64×64 coding region. The 64×64 coding region refers to the fact that each CTU with 128×128 luma samples (plus corresponding chroma samples) can be divided into 4 non-overlapped 64×64 regions. Each of these 64×64 regions is considered as the 64×64 coding region in the constraints in some examples.

In an embodiment, the top left corner of a reference block is denoted as (Ref_TLx, Ref_TLy); the bottom right corner of a reference block is denoted (Ref_BRx, Ref_BRy) assuming the top-level corner of the CTU is (0, 0) for example. The additional constrains is in the form of bitstream conformance requirements that the following conditions (Eq. 1) and (Eq. 2) shall be met:

$$\text{Ref\_BR}x/64 = \text{Ref\_TL}x/64 \qquad (\text{Eq. 1})$$

$$\text{Ref\_BR}y/64 = \text{Ref\_TL}y/64 \qquad (\text{Eq. 2})$$

When (Eq. 1) is satisfied, the integer portion of Ref_BRx/64 is equal to the integer portion of Ref_TLx/64. When (Eq. 2) is satisfied, the integer portion of Ref_BRy/64 is equal to the integer portion of Ref_TLy/64. It is noted the division operations can be performed by right shifting of 6 bits.

In some embodiments, when a block vector points to a reference block location, where not all the samples in this reference block belong to the same 64×64 coding region, the block vector can be clipped to a nearby reference block location that meets the same 64×64 coding region requirement. In an embodiment, the clipping refers to move the original reference block location (which covers at least two 64×64 regions) towards one direction vertically or horizontally. In an example, the moving is in a direction to reduce the distance between the reference block and current block. Also, the moving is in a direction to increase the percentage of reference samples that belong to the same 64×64 sample region and eventually make the whole reference block belong to the same 64×64 region.

In a case of the example shown in FIG. 11A, the reference block can be moved vertically up until all samples belong to the top 64×64 coding region. It is noted that, in FIG. 11A example, moving the reference block downward can increase the distance between two blocks and moving the reference block horizontally does not change the percentage of samples in each 64×64 coding region.

In a case of the example shown in FIG. 11B, the reference block can be moved horizontal right until all samples belong to the current 64×64 coding region. It is noted that, in the FIG. 11B example, moving the reference block leftward can increase the distance between two blocks; and moving vertically does not change the percentage of samples in each 64×64 coding region.

In some embodiments, when a block vector points to a reference block location, where not all the samples in this reference block belong to the same 64×64 coding region, the samples outside the 64×64 coding region may be generated by sample padding (vertically and/or horizontally duplicate the samples on the boundary of the 64×64 coding region). The padding process can be performed in the similar manner as border extension for reference picture in motion compensation.

In an example, the top left corner of a reference block is located is in a 64×64 coding region, and then the 64×64 coding region is considered as where the coding region the reference block should come from. If any part of the reference block is outside that coding region, padding can be used to determine the samples of that part.

In another example, the bottom right corner of the reference block is located in a 64×64 coding region, and then the 64×64 coding region is considered as where the reference block should come from. If any part of a reference block is outside that coding region, padding can be performed to determine the samples of that part.

In another example, the top left corner of the reference block is located in a 64×64 coding region, and the 64×64 coding region is used first to determine which coding region the reference block comes from. When the location is not a valid reference location, then the bottom right corner of the reference block is considered to determine which coding region the reference block comes from.

In another example, the bottom right corner of the reference block is located in a 64×64 coding region, and the 64×64 coding region is used first to determine which coding region the reference block comes from. If the location is not a valid reference location, then the top left corner of the reference block is considered to determine which coding region the reference block comes from.

In another embodiment, when a block vector points to a reference block location, where all the samples in the reference block are outside the valid reference region (either current 64×64 coding region or previously coded 64×64 coding region(s)), the samples outside the 64×64 coding region may be generated by sample padding (vertically and/or horizontally duplicate the samples on the boundary of the closest valid reference region. The padding process may be performed in the same manner as border extension for reference picture in motion compensation, where the border can be regarded as the boundary of the allowed reference region(s).

Aspects of the disclosure also provide flexible block partitioning strategies and the buffer reuse mechanism for intra block copy.

In some embodiments, when intra block copy is used for a given coding level (such as for a sequence, for a picture or for a slice/tile/tile group), the flexible block partition types, such as 128×32/32×128, cannot be used.

In an embodiment, for a given coding level (such as for a sequence, for a picture or for a slice/tile/tile group), when the flexible block partition types are not used, intra block copy mode can use the reference sample memory reuse strategies. For example, the 64×64 coding region based update process and buffer reuse strategies can be used.

In an embodiment, for a given coding level (such as for a sequence, for a picture or for a slice/tile/tile group), when the flexible block partition types are in use, intra block copy mode cannot use reference sample memory reuse strategies disclosed in the above disclosure. Instead, in an example, the block vector is restricted to refer to reconstructed parts of the current CTU.

In an embodiment, for a given coding level (such as for a sequence, for a picture or for a slice/tile/tile group), when the above-mentioned flexible block partition types are in use, the above-mentioned reference sample memory reuse strategies may be modified.

In some examples, when coding blocks are in the first TT partition (e.g., left 32×128 or top 128×32), or BT partition (top 128×64 or left 64×128) or QT partition (top-left 64×64) at CTU (128×128) level, a portion of reference samples in the left CTU can be used.

FIGS. 12A-12F show examples of reference samples memory reuse strategies. In each of the FIGS. 12A-12F examples, the current coding block is shown by slant lines, and the available reference area is shown by grey color.

In an example, the top-right corner 64×64 (samples) region in the left CTU is the available reference area, as shown by grey color in the examples of FIGS. 12A-12C.

In another example, the right most 32×128 (samples) region in the left CTU is the available reference area, as shown by grey color in the examples of FIGS. 12D-12F.

In another example, the top 128×32 region in the left CTU is the available reference area.

In another example, the choice of a region is determined by the partitions of the left CTU. For example, when the left CTU uses quadtree partition at 128×128 level, then the top-right 64×64 (samples) region in the left CTU may be used to predict coding block in the first partition of current CTU.

In another example, when a total of 3×64×64 sized memory is used, for a coding block in the first partition of the current CTU, the size of memory that can be used to store reference samples from the left CTU is 64×64 in size (not necessarily to be a square). It is noted that the memory space is not necessarily to store the samples in a square shape.

In another embodiment, when a total 4×64×64 sized memory is used, for a coding block in the first partition of current CTU, the size of memory that can be used to store reference samples from the left CTU is 2×64×64 in size (not necessarily to be a two squares). It is noted that the memory space is not necessarily to store the samples in two squares.

In some embodiments, when flexible block partition types and intra block copy mode are both used in a given coding level (such as for a sequence, for a picture or for a slice/tile/tile group), techniques are used to reuse the reference sample memory so that the search range of intra block copy can be effectively increased while the memory requirement is kept the same or reduced.

In some examples, a smaller or same granularity update process with more block shapes can be proposed, such as in the shapes of 32×32 or 32×64 or 64×32 or 16×128, instead of using 64×64 based update process previously. In an example, the update process can use 32×32 (samples) unit, and the current CTU is partitioned using TT at 128×128 level.

Figure 13A:
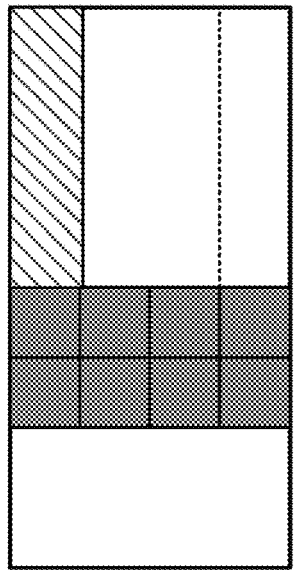
FIGS. 13A-13F show examples of an update process according to some embodiments of the disclosure.
Figure 13B:
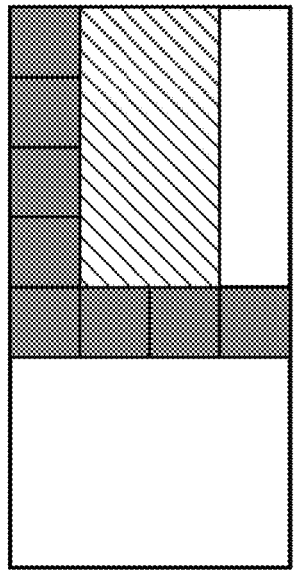
Figure 13C:
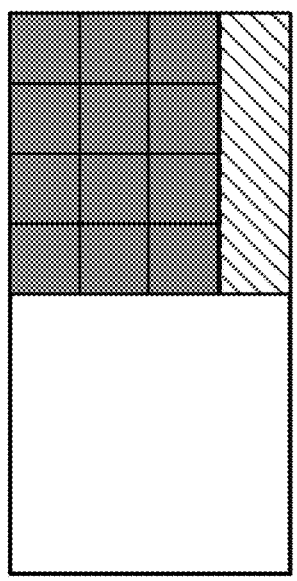
Figure 13D:
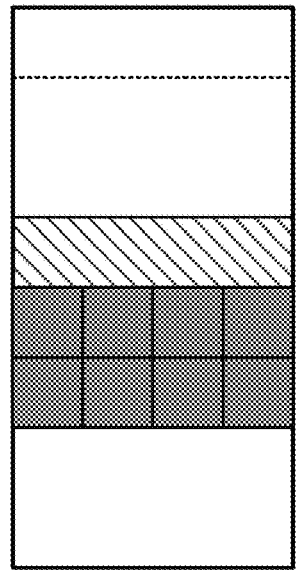
Figure 13E:
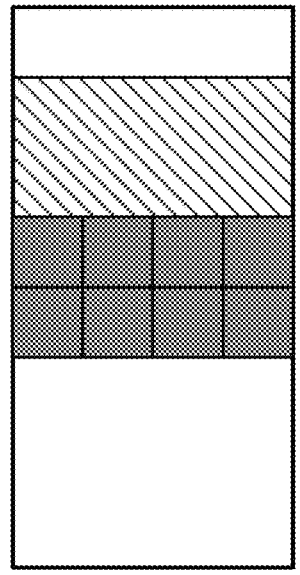
Figure 13F:
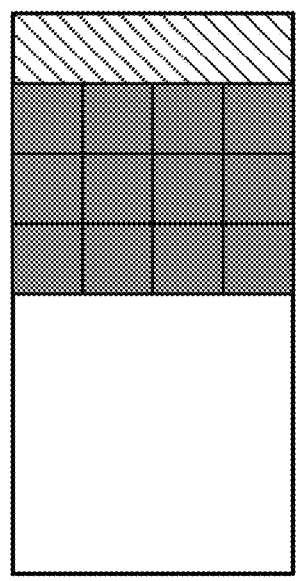

FIGS. 13A-13C show an example of an update process that uses 32×32 (samples) unit, and FIGS. 13D-13F show another example of an update process that uses 32×32 (samples). Each 32×32 (samples) unit is shown as a small square. In the FIGS. 13A-13F examples, the reference sample memory size is 128×128 in total. Then, a first memory space of 3×64×64 samples is allocated to store samples that can be reference samples for intra block copy reference purpose, and a second memory space of 64×64 samples is allocated for the current 64×64 sized unit (not necessarily to be a square, the total number of luma samples is equal to 64×64 samples). For each 64×64 or 64×128 sized partition and its sub-partitions (not necessary to be square, the total number of luma samples is equal to 64×64), the reconstructed samples in the current CTU and some other previously coded regions, such as indicated by the grey areas in FIG. 13A-13F can be stored in the reference sample memory and can be referred for the intra block copy prediction.

Figure 14:
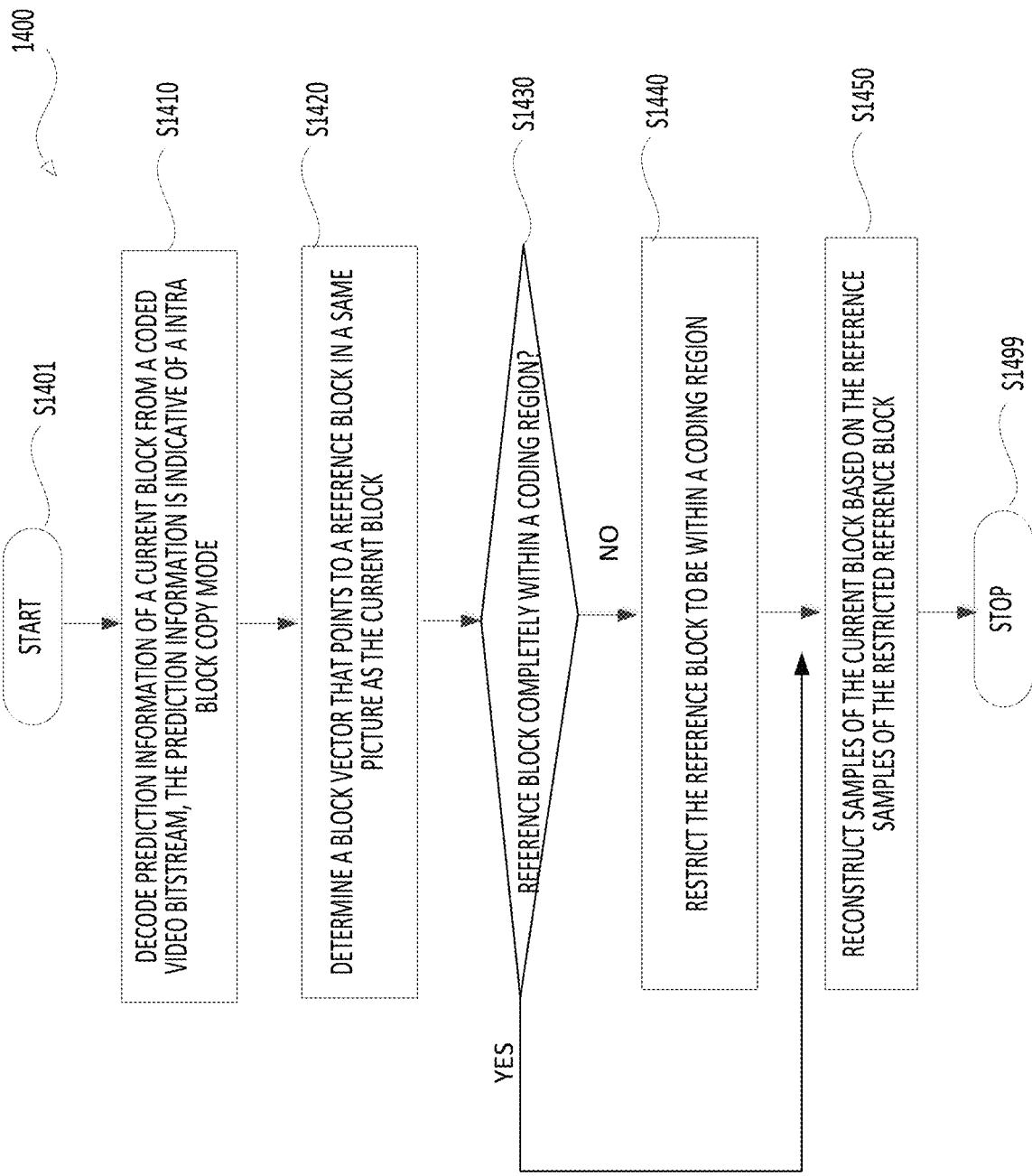
FIG. 14 shows a flow chart outlining a process example according to some embodiments of the disclosure.

FIG. 14 shows a flow chart outlining a process (1400) according to an embodiment of the disclosure. The process (1400) can be used in the reconstruction of a block coded in intra mode, so to generate a prediction block for the block under reconstruction. In various embodiments, the process (1400) are executed by processing circuitry, such as the processing circuitry in the terminal devices (110), (120), (130) and (140), the processing circuitry that performs functions of the video encoder (203), the processing circuitry that performs functions of the video decoder (210), the processing circuitry that performs functions of the video decoder (310), the processing circuitry that performs functions of the video encoder (403), and the like. In some embodiments, the process (1400) is implemented in software instructions, thus when the processing circuitry executes the software instructions, the processing circuitry performs the process (1400). The process starts at (S1401) and proceeds to (S1410).

At (S1410), prediction information of a current block is decoded from a coded video bitstream. The prediction information is indicative of intra block copy mode.

At (S1420), a block vector that points to a reference block in the same picture as the current block is determined.

At (S1430), the reference block is checked to determine whether the reference block is completely within a coding region. In some embodiments, a reference sample memory having a limited storage space is reused to store previous coded samples. For example, before the reference sample memory is updated with reconstructed samples in the current CTU, the reference sample memory stores samples in the left CTU of the current CTU. The reference sample memory is updated with reconstructed samples in the current CTU in the unit of coding region. In an embodiment, the availability of the reference sample memory is updated on a 64×64 basis. In an example, if any of the reference samples in a 64×64 block has been updated, the entire 64×64 block is considered as being updated with reconstructed samples from the current CTU and will no longer be considered as storing samples before the update. In an embodiment, a CTU of 128×128 samples includes four 64×64 regions that can be referred to as coding regions.

In an embodiment, multiple corners of the reference block are checked to determine whether the reference block is completely within a coding region. When the reference block is completely in the coding region, the process proceeds to (S1450); otherwise, the process proceeds to (S1440).

At (S1440), the reference block is suitably restricted in the coding region. In some embodiments, the reference block is suitably moved into the coding region. In some embodiments, some reference samples that are not in the coding region can be padded with other reference samples that are in the coding region. Then, the memory access to retrieve the reference samples for reconstruction of the current block can be achieved by accessing only one memory update unit in an example.

At (S1450), the current block is reconstructed based on the reconstructed samples of the reference block that are retrieved from the reference sample memory. For example, the reference sample memory is accessed to retrieve the reconstructed samples of the reference block, and then samples of the current block are reconstructed based on the reconstructed samples that are retrieved from the reference sample memory. Because the reference block is restricted that reference samples of the reference block are completely in one coding region, or can be determined based on one coding region, then address operations for retrieving the reference samples can be performed with ease and high efficiency. Then the process proceeds to (S1499) and terminates.

The techniques described above, can be implemented as computer software using computer-readable instructions and physically stored in one or more computer-readable media. For example, FIG. 15 shows a computer system (1500) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 15:
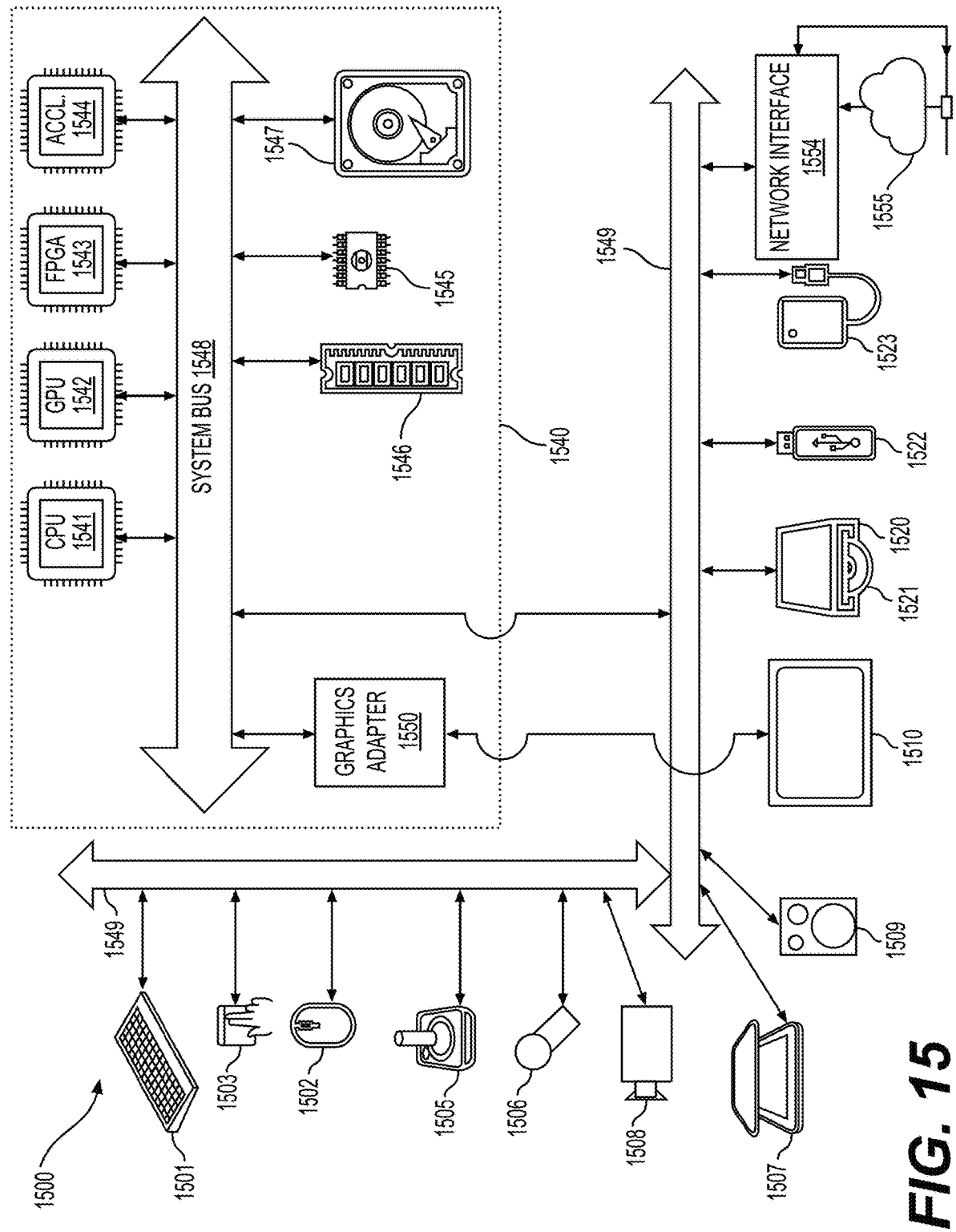
FIG. 15 is a schematic illustration of a computer system in accordance with an embodiment.

The components shown in FIG. 15 for computer system (1500) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1500).

Computer system (1500) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1501), mouse (1502), trackpad (1503), touch screen (1510), data-glove (not shown), joystick (1505), microphone (1506), scanner (1507), camera (1508).

Computer system (1500) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1510), data-glove (not shown), or joystick (1505), but there can also be tactile feedback devices that do not serve as input devices), audio output devices (such as: speakers (1509), headphones (not depicted)), visual output devices (such as screens (1510) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1500) can also include human accessible storage devices and their associated media such as optical media including CD/DVD ROM/RW (1520) with CD/DVD or the like media (1521), thumb-drive (1522), removable hard drive or solid state drive (1523), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1500) can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1549) (such as, for example USB ports of the computer system (1500)); others are commonly integrated into the core of the computer system (1500) by attachment to a system bus as described below (for example Ethernet interface into a PC computer system or cellular network interface into a smartphone computer system). Using any of these networks, computer system (1500) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1540) of the computer system (1500).

The core (1540) can include one or more Central Processing Units (CPU) (1541), Graphics Processing Units (GPU) (1542), specialized programmable processing units in the form of Field Programmable Gate Areas (FPGA) (1543), hardware accelerators for certain tasks (1544), and so forth. These devices, along with Read-only memory (ROM) (1545), Random-access memory (1546), internal mass storage such as internal non-user accessible hard drives, SSDs, and the like (1547), may be connected through a system bus (1548). In some computer systems, the system bus (1548) can be accessible in the form of one or more physical plugs to enable extensions by additional CPUs, GPU, and the like. The peripheral devices can be attached either directly to the core's system bus (1548), or through a peripheral bus (1549). Architectures for a peripheral bus include PCI, USB, and the like.

CPUs (1541), GPUs (1542), FPGAs (1543), and accelerators (1544) can execute certain instructions that, in combination, can make up the aforementioned computer code. That computer code can be stored in ROM (1545) or RAM (1546). Transitional data can be also be stored in RAM (1546), whereas permanent data can be stored for example, in the internal mass storage (1547). Fast storage and retrieve to any of the memory devices can be enabled through the use of cache memory, that can be closely associated with one or more CPU (1541), GPU (1542), mass storage (1547), ROM (1545), RAM (1546), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1500), and specifically the core (1540) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1540) that are of non-transitory nature, such as core-internal mass storage (1547) or ROM (1545). The software implementing various embodiments of the present disclosure can be stored in such devices and executed by core (1540). A computer-readable medium can include one or more memory devices or chips, according to particular needs. The software can cause the core (1540) and specifically the processors therein (including CPU, GPU, FPGA, and the like) to execute particular processes or particular parts of particular processes described herein, including defining data structures stored in RAM (1546) and modifying such data structures according to the processes defined by the software. In addition or as an alternative, the computer system can provide functionality as a result of logic hardwired or otherwise embodied in a circuit (for example: accelerator (1544)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

APPENDIX A: ACRONYMS

JEM: joint exploration model
VVC: versatile video coding
BMS: benchmark set
MV: Motion Vector
HEVC: High Efficiency Video Coding
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof

What is claimed is:

1. A method for video decoding in a decoder, comprising:
decoding prediction information of a current block of a current coding region in a coded video bitstream, the prediction information being indicative of an intra block copy mode;
determining a block vector that points to a reference block in a same picture as the current block, the reference block being located within a search range, the search range including reconstructed samples of coding regions comprising a coding tree unit (CTU) of the current block and reconstructed samples of at least one coding region comprising a CTU adjacent to the CTU of the current block;
reconstructing at least a sample of the current block based on reconstructed samples of the reference block ; and
updating the search range for reconstruction of a next coding region such that reconstructed samples of the current block are included in the updated search range and the reconstructed samples of the at least one coding region comprising the CTU adjacent to the CTU of the current block are not available in the updated search range.

2. The method of claim 1, wherein each coding region has a square shape.

3. The method of claim 1, wherein each CTU is configured to have 128 samples by 128 samples of a luma component.

4. The method of claim 1, wherein the search range is updated in a unit of one coding region.

5. The method of claim 1, further comprising:
checking whether multiple corners of the reference block are within a coding region.

6. The method of claim 5, wherein
each CTU contains 128×128 luma samples and each coding region is 64×64 luma samples in size.

7. The method of claim 5, wherein
each CTU contains less than 128×128 luma samples and each coding region is the same as the CTU in size.

8. The method of claim 1, further comprising:
moving the reference block into the search range when the reference block is partially in the search range before the moving.

9. The method of claim 8, further comprising:
moving the reference block in a direction to reduce a distance between the reference block and the current block.

10. The method of claim 8, further comprising:
moving the reference block in a direction that increases a percentage of reference samples in a coding region.

11. The method of claim 1, further comprising:
using information of a first reference sample that is in the search range as information of a second reference sample that is out of the search range when the reference block is partially in the search range.

12. The method of claim 1, wherein flexible block partition is prohibited as a partition of each CTU.

13. An apparatus of video decoding, comprising:
processing circuitry configured to:
decode prediction information of a current block of a current coding region in a coded video bitstream, the prediction information being indicative of an intra block copy mode;

determine a block vector that points to a reference block in a same picture as the current block, the reference block being located within a search range, the search range including reconstructed samples of coding regions comprising a coding tree unit (CTU) of the current block and reconstructed samples of at least one coding region comprising a CTU adjacent to the CTU of the current block;

reconstruct at least a sample of the current block based on reconstructed samples of the reference block; and updating the search range for reconstruction of a next coding region such that reconstructed samples of the current block are included in the updated search range and the reconstructed samples of the at least one coding region comprising the CTU adjacent to the CTU of the current block are not available in the updated search range.

14. The apparatus of claim 13, wherein each coding region has a square shape.

15. The apparatus of claim 13, wherein each CTU is configured to have 128 samples by 128 samples of a luma component.

16. The apparatus of claim 13, wherein the search range is updated in a unit of one coding region.

17. The apparatus of claim 13, wherein the processing circuitry is further configured to:
    check whether multiple corners of the reference block are within a coding region.

18. The apparatus of claim 17, wherein
    each CTU contains 128×128 luma samples and each coding region is 64×64 luma samples in size.

19. The apparatus of claim 17, wherein
    each CTU contains less than 128×128 luma samples and each coding region is the same as the CTU in size.

20. The apparatus of claim 13, wherein the processing circuitry is further configured to:
    move the reference block into the search range coding region when the reference block is partially in the search range before the moving.

* * * * *